United States Patent [19]

Wan

[11] Patent Number: 6,044,069
[45] Date of Patent: Mar. 28, 2000

[54] POWER MANAGEMENT SYSTEM FOR A MOBILE STATION

[75] Inventor: Yongbing Wan, Irvine, Calif.

[73] Assignee: Conexant Systems, Inc., Newport Beach, Calif.

[21] Appl. No.: 08/959,588

[22] Filed: Oct. 29, 1997

[51] Int. Cl.$^7$ .................................................. G08C 17/00
[52] U.S. Cl. .................... 370/311; 370/337; 455/38.3; 455/458
[58] Field of Search .................................. 370/311, 328, 370/329, 337, 341, 347; 455/434, 38.3, 922, 38.2, 343, 515, 412, 414–420, 574, 458

[56] References Cited

U.S. PATENT DOCUMENTS

| | | | |
|---|---|---|---|
| 5,058,203 | 10/1991 | Inagami | 455/343 |
| 5,128,938 | 7/1992 | Borras | 455/343 |
| 5,405,355 | 4/1995 | Raith | 455/38.3 |
| 5,539,748 | 7/1996 | Raith | 455/38.3 |
| 5,574,996 | 11/1996 | Raith | 455/343 |
| 5,603,081 | 2/1997 | Raith et al. | 455/434 |
| 5,737,323 | 4/1998 | Lansdowne | 455/38.3 |
| 5,815,819 | 9/1998 | Ohta et al. | 455/574 |

OTHER PUBLICATIONS

Siegmund M. Redl et al., *An Introduction to GSM* 19–105 (1995).

*Primary Examiner*—Ajit Patel
*Attorney, Agent, or Firm*—Knobbe, Martens Olson & Bear, LLP

[57] ABSTRACT

A power management system for a mobile station reduces standby mode processing by receiving and processing single time slots of a short paging channel. Each single time slot of a short paging channel includes a mobile station identifier which alerts a receiving mobile station that a pending telephone call or paging message may be directed to the mobile station. Once so alerted, the mobile station receives and processes full paging channels comprising four time slots to determine whether the mobile station is the intended recipient of the telephone call or paging message. If the mobile station determines that it is not the intended recipient, then the mobile station resumes receiving and processing single time slots of the short page channel. Processing fewer time slots of data for purposes of call detection conserves mobile station battery power.

19 Claims, 16 Drawing Sheets

POWER MANAGEMENT SYSTEM FOR A MOBILE STATION

BACKGROUND

This invention relates to the field of wireless communication systems. More specifically, the present invention relates to a power management system for mobile stations.

The use of wireless communication systems is growing every day with users now numbering well into the millions. Mobile stations, such as handheld telephones, are becoming more portable and easier to use all the time, and mobile station users now rely daily on the availability of wireless systems to accommodate their communication needs. However, the single greatest inconvenience associated with routine use of a mobile station is the constant need to recharge and replace worn down batteries. Even users who make and receive very few telephone calls and operate their mobile stations mostly in the standby mode (awaiting calls) experience the annoying and frequent problem of the mobile station running out of battery power thus becoming dead and useless until the worn battery is replaced with a charged battery. Users demand mobile stations having the longest possible battery life.

A large portion of battery power consumed in standby mode is attributable to call detection processing. For example, in GSM-based wireless communication networks, about once every second a mobile station receives and decodes a full paging message comprising four groups of digital data transmitted at certain time intervals to detect any calls. Only rarely does the detection attempt result in discovery of a telephone call for the mobile station. A great deal of battery power is consumed in this call detection process.

Also, while in standby mode, a mobile station periodically receives and processes transmitted broadcast control data including information about communication parameters (channels, frequencies, communication options, etc.). Existing mobile stations receive and process broadcast control data frequently and without fail, for example every 30 seconds, regardless of whether the information contains anything useful to the mobile station. Again, battery power is consumed by this processing even where the mobile station obtains no new information.

Battery power is even consumed when the mobile station is performing no receiving and processing whatsoever. This is because existing mobile stations use a very high precision master clock that runs continuously. Such master clocks are extremely precise and permit the mobile stations to engage in precisely timed communication as required by many wireless communications standards, and particularly by those such as GSM which depend on time division multiple access wherein mobile stations are allocated very short time periods within which to communicate. The high precision of master clocks comes at a price, however, as such master clocks consume battery power at a much higher rate than clocks having lower precision.

Improvements in battery technology, while helpful, have done little to avoid the seemingly ever-present need to recharge and replace mobile station batteries. What is needed is a system to conserve battery power by minimizing mobile system processing, particularly in standby mode.

SUMMARY

The present invention is directed to reducing power consumed by a mobile station operating in standby mode. The present information reduces the quantity of data that the mobile station receives and processes to detect pending telephone calls or paging messages. The reduced processing consumes less power and advantageously increases the standby mode lifetime of a mobile station battery. Moreover, the present invention reduces the frequency with which the mobile station receives and processes broadcast control information while preserving the ability of the mobile station to detect and process any updated information in a broadcast control channel. Processing fewer broadcast control channels also has the advantage of increasing the lifetime of a mobile station battery. Further, the invention reduces the power consumed by the mobile station when completely idle (i.e., when the mobile station is not receiving, transmitting, or processing any data), still further increasing the lifetime of a mobile station battery.

In one embodiment of the present invention, a mobile station comprises: (1) a software instruction processing unit; (2) a software instruction storage comprising a computer-readable medium, the software instruction storage accessible to the software instruction processing unit; (3) a short page channel receiving module stored in the software instruction storage, the short page channel receiving module including receiving instructions executed by the software instruction processing unit, the receiving instructions causing the mobile station to scan broadcast information in a wireless communication network for a short page channel and to receive a single time slot of the short page channel containing one group of call alert data; and (4) a short page processing module stored in the software instruction storage, including processing instructions executed by the software instruction processing unit, the processing instructions causing the mobile station to process the one group of call alert data and to determine from the group of call alert data whether a pending telephone call or paging message may have been directed to the mobile station. A preferred aspect of the mobile station further comprises: (1) an idle state wherein the mobile station does not scan for a short page channel or receive or process call alert information, the mobile station entering the idle state during a time period between broadcasts of the short page channel; and (2) a battery providing power to the mobile station, the mobile station consuming the power at a first rate during the scanning for the short page channel and during receiving or processing the call alert information, the mobile station consuming the power at a second rate in the idle state, the second rate being less than the first rate. A further preferred aspect of the mobile station further comprises: (1) a master clock; and (2) a low precision clock, the low precision clock being sufficiently precise to time the receipt of a single short page channel time slot, the low precision clock less precise than the master clock, the low precision clock consuming less power during a time interval than the master clock, the low precision clock timing the idle state, the master clock shut down during the idle state.

In another embodiment, a mobile station comprises: (1) a call alert module structured to extract an alert message from transmitted call alert data, the call alert module responding to call alert data received from a call alert channel of a wireless communication system by alerting the mobile station of a pending telephone call or paging message which may be directed to the mobile station; and (2) a paging module structured to extract a paging message from transmitted paging data, the paging module responding to paging data received from a paging channel of the wireless communication system by determining whether the telephone call or paging message is directed to the mobile station, the alert data requiring less processing than the paging data. A preferred aspect of the mobile station further comprises a call establishment module which initiates the establishment of a communication link to a communication device responsible for initiating the telephone call or paging message, the call establishment module invoked upon the determining that the telephone call or paging message is directed to the mobile station.

In a further embodiment of the present invention, a cellular system comprises: (1) a base station; (2) a cell; (3) a receiver in the cell; (4) an alert channel in which the base station transmits within the cell alert information to alert the receiver of a pending telephone call or paging message; and (5) a paging channel in which the base station transmits within the cell paging information to notify a receiver that the receiver is the intended recipient of said telephone call or paging message, the paging information requiring less processing by the receiver than the alert information. In a preferred aspect, the cellular system further comprises receiver identity information within the alert information, the receiver identity information not uniquely identifying the receiver.

In still another embodiment of the present invention, a mobile station, with reduced standby processing requirements, comprises: (1) a data storage area; (2) a paging group value stored in the data storage area, the paging group value specifying first paging channels, the paging group value assigned to the mobile station by a mobile switching center; and (3) a paging channel skipping value stored in the data storage area, the paging channel skipping value specifying a subset of the first paging channels, the subset identifying paging channels transmitted less frequently than said first paging channels, the mobile station receiving and processing the subset of the first paging channels.

In a still further embodiment of the present invention, a short page channel time slot is stored in a computer-readable medium. The short page channel comprises: (1) mobile station identity information from which a mobile station receiving the short page channel time slot as part of a broadcast TDMA frame determines that a pending telephone call or paging message may have been directed to the mobile station; and (2) error detection information from which a mobile station receiving the error detection information along with the mobile station identity information in the short page channel time slot determines whether data received in the short page channel time slot contains errors.

In another embodiment of the present invention, a mobile switching center comprises: (1) a data storage area, the data storage area containing a mobile station identifier value associated with a mobile station; and (2) a short page channel creation module invoked by the mobile switching center upon detection by the mobile switching center that a telephone call is being directed to the mobile station, the short page channel creation module combining in a single time slot of a TDMA frame the mobile station identifier value and error detection data, the mobile switching center including the single time slot of the TDMA frame within a multiframe for transmission to a base station. In a preferred aspect, the mobile switching center further comprises a bit for updating broadcast control information, the bit combined in the single time slot, the bit having a first value if the content of the most recently transmitted broadcast control channel in a particular cell did not change from the content of an immediately preceding broadcast control channel transmitted to the same cell, the bit having a second value if the content of the recently transmitted broadcast control channel is different from the content of the immediately preceding broadcast control channel.

In yet another embodiment of the present invention, a mobile station, with reduced requirements for processing broadcast control data, comprises: (1) a data storage area; (2) a short page channel data buffer in the data storage area including a bit reserved for updating broadcast control information, the bit received by the mobile station from a time slot of a TDMA frame; (3) a software instruction storage in a computer-readable medium; (4) a broadcast control update module stored in the software instruction storage, the broadcast control update module responding to receipt of the bit by comparing the bit to a prior received bit stored in the data storage area and, if the compared bits differ, directing the mobile station to receive and process a next transmitted broadcast control channel to update communication parameters of the mobile station, otherwise if the compared bits are the same, storing the newly received bit in place of the prior received bit.

In another embodiment of the present invention, a mobile station comprises: (1) a master clock; and (2) a low precision clock, the low precision clock consuming less power than the master clock, the low precision clock used to time an idle state wherein the mobile station is not receiving, transmitting, or processing data, the master clock shut down during the idle state.

In still another embodiment of the present invention, a wireless communication system comprises: (1) a mobile switching center, the mobile switching center generating a first single time slot of a short page channel, the first single time slot including a first mobile station identifier value, the mobile switching center transmitting the first single time slot to a base station, the mobile switching center generating a paging channel having four time slots, the four time slots including a second mobile station identifier, the mobile switching center transmitting the four time slots to the base station; (2) a base station which receives the first single time slot and the four time slots, the base station transmitting to a cell the first single time slot in a short page channel and the four time slots in a paging channel; and (3) a mobile station in the cell, the mobile station identified by the first mobile station identifier and by the second mobile station identifier, the mobile station receiving the first single time slot from the short page channel and extracting the first mobile station identifier from the first single time slot to determine that a pending telephone call or paging message may be directed to the mobile station, the mobile station, upon the determination, receiving the four time slots from the paging channel and extracting the second mobile station identifier to conclude that the mobile station is the intended recipient of the telephone call or paging message, the mobile station, upon the conclusion, initiating call establishment procedures to create a communication link between the mobile station and a communication device responsible for initiating the telephone call or paging message. In a preferred aspect, wireless communication system comprises a broadcast control update bit, the update bit included in the first single time slot, the update bit having a first value if the content of a most recently transmitted broadcast control channel in the cell did not change from the content of an immediately preceding broadcast control channel transmitted to the cell, the bit having a second value if the content of the recently transmitted broadcast control channel is different from the content of the immediately preceding broadcast control channel, the mobile station extracting the update bit from the first single time slot and, if the update bit has the second value, then the mobile station receiving and processing a next transmitted broadcast control channel. In another preferred aspect, the wireless communication system comprises: (1) a data storage area in the mobile station; (2) a paging group value stored in the data storage area, the paging group value specifying first paging channels, the paging group value assigned to the mobile station by the mobile switching center; and (3) a paging channel skipping value stored in the data storage area, the paging channel skipping value specifying a subset of the first paging channels, the subset including a number of paging channels fewer than the number of paging channels comprising the first paging channels, the mobile station receiving and processing the subset of the first paging channels. In another preferred aspect, the wireless communication system further comprises: (1) a master clock timing the receipt of the four time slots by the mobile station; (2) a second single time slot, the mobile switching center transmitting the second single time slot to the base station, the base station transmitting to the cell the second single time slot in the short page channel, the mobile station receiving the second single time slot from the short page channel upon determining from the receipt of the first single time slot that a pending telephone call or paging message is not directed to the mobile station; and (3) a low precision clock timing the duration of an idle state wherein the mobile station does not receive, transmit, or process data, the duration of the idle state occurring after the receipt by the mobile station of the first single time slot and before the receipt by the mobile station of the second single time slot, the second single time slot containing sufficient synchronization bits to permit the receipt of the second single time slot, the master clock shut down during the idle state, the low precision clock consuming less power during a time interval than the master clock.

These and other embodiments are described in more detail below.

DETAILED DESCRIPTION

Figure 1:
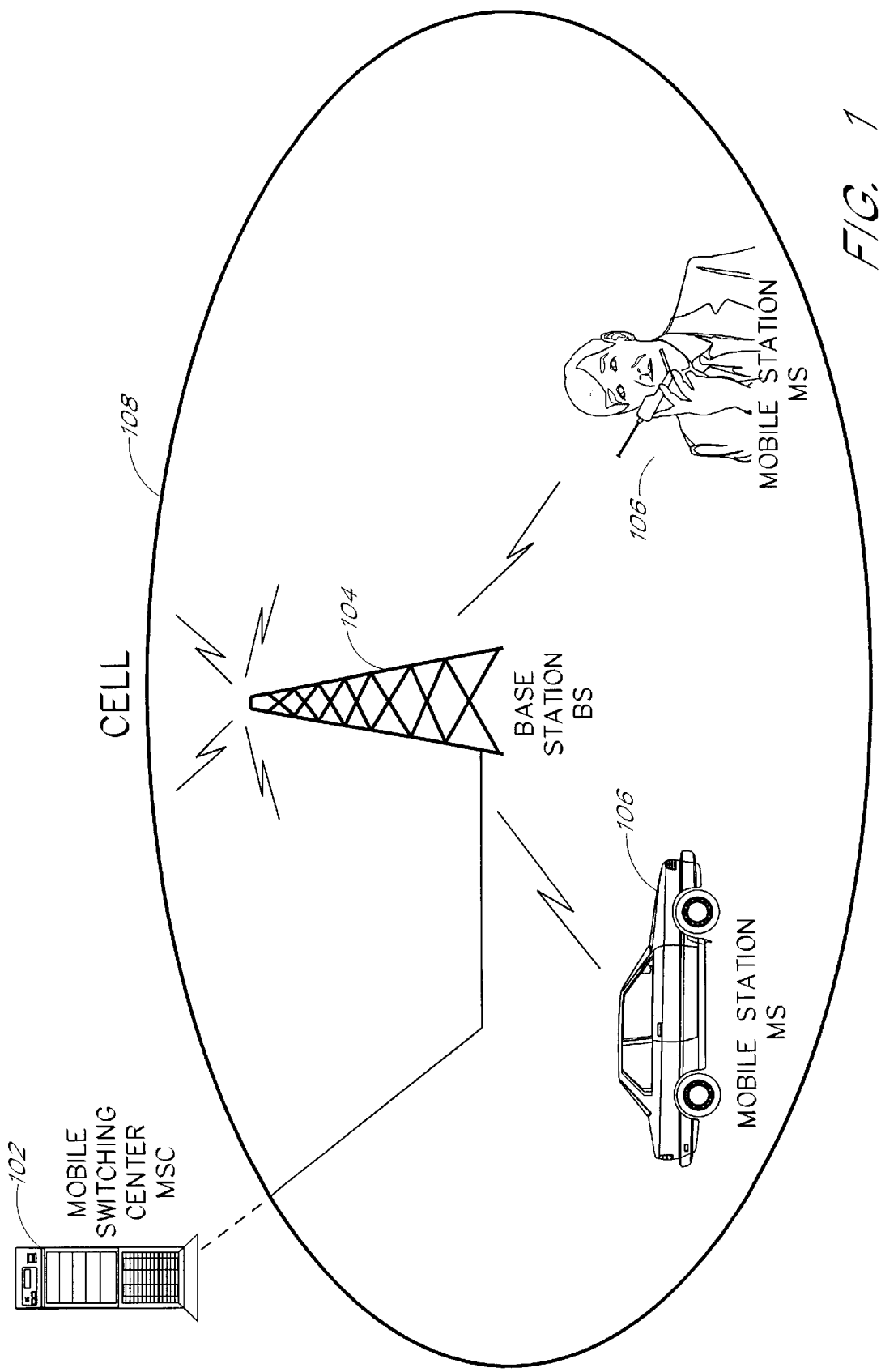
FIG. 1 illustrates components of a wireless communication system.

FIG. 1 illustrates components of a wireless communication system. A mobile switching center (MSC) 102 communicates with a base station (BS) 104. The base station 104 broadcasts data to and receives data from mobile stations 106 within a cell 108. The cell 108 is a geographic region, roughly hexagonal, having a radius of up to 35 kilometers or possibly more.

A mobile station 106 is capable of receiving data from and transmitting data to a base station 104 in compliance with GSM (global system for mobile communications). GSM is a communication standard permitting mobile users of wireless communication devices to exchange data over a telephone system wherein radio signals carry data to and from the wireless devices.

Under the GSM standard, additional cells adjacent to the cell 108 permit mobile stations 106 to cross cell boundaries without interrupting communications. This is so because base stations in adjacent cells assume the task of transmitting and receiving data for the mobile station 106. The mobile switching center 102 coordinates all communication to and from mobile stations in a multi-cell region, thus the mobile switching center 102 may communicate with many base stations.

Mobile stations 106 may move about freely within the cell 108 while communicating either voice or data to other, perhaps fixed, telephone users. Mobile stations not in active communication with other telephone system users may, nevertheless, scan base station 104 transmissions in the cell 108 to detect any telephone calls or pages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by GSM) to synchronize communication with the base station 104. The cellular telephone then registers with the mobile switching center 102 to make itself known as an active user within the GSM network. The cellular telephone scans data frames broadcast by the base station 104 to detect any telephone calls or pages directed to the cellular telephone. In this call detection mode, the cellular telephone receives, stores and examines paging channel data, and determines whether the data contain a mobile station identifier matching an identifier of the cellular telephone. If a match is detected, the cellular telephone engages in a call establishment conversation with the mobile switching center 102 via the base station 104. If no match is detected, the cellular telephone enters an idle state for a predetermined period of time, then exits the idle state to receive another transmission of paging channel data.

The receiving and processing of paging channel information to detect telephone calls and page messages consumes power. Millions of consumers use mobile stations 106, such as portable, hand held cellular telephones, that rely on batteries for power. Consumers routinely carry two, three and sometimes more cellular telephone batteries due to the relatively short life of the charge in one battery. Even consumers who initiate and receive relatively few telephone calls on their cellular telephones must frequently recharge and replace batteries because of the power consumed by the cellular telephone while in standby operation (waiting for an incoming call).

The present invention substantially reduces the power consumed by a cellular telephone (or other mobile station) to detect telephone calls or paging messages and consequently increases battery lifetime. To reduce power consumption, the present invention provides a short page message (or call alert message) containing one-fourth the data of existing paging (call detection) messages. A mobile station thus receives and processes the short page message to detect telephone calls and page messages, rather than receiving and processing the existing, much longer paging messages. The short page message alerts the mobile station 106 that there may be a telephone call or paging message directed to the mobile station, in which case it then looks for and processes a longer paging message. The invention substantially reduces call detection processing and increases the amount of idle time between call detection processing, thus substantially extending the lifetime of a single battery charge.

A common implementation of the GSM system uses frequencies in the 900-MHz range. In particular, mobile stations 106 transmit in the 890–915-MHz range and base stations 104 transmit in the higher 935–960-MHz range. Each 25-MHz range is divided into 125 radio frequency channels, each having a width of 200 kHz. The direction of communication from a mobile station 106 to a base station 104 is referred to as uplink, and the direction from a base station 104 to a mobile station 106 is referred to as downlink.

Figure 2:
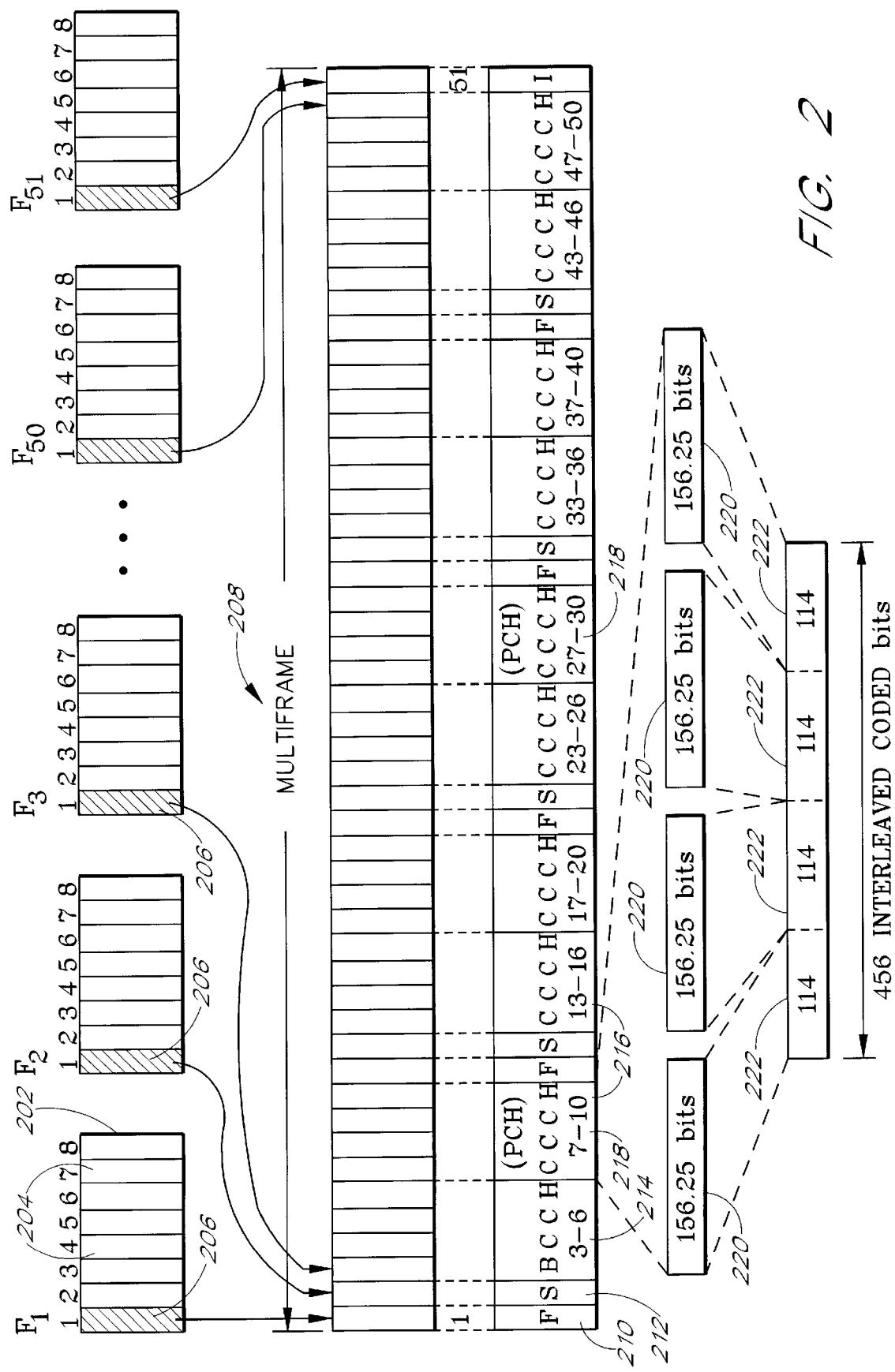
FIG. 2 illustrates wireless communication signal data transmitted by a base station and structured in data frames.

FIG. 2 illustrates wireless communication signal data transmitted by a base station 104 and structured in data frames, sometimes called time-division multiple access (TDMA) frames, according to the GSM standard. The GSM specification provides eight time slots (or physical channels) in each 200 kHz radio channel. An entire data frame has a duration of 4.615 milliseconds. Each time slot has a time length of 577 microseconds (4,615/8=577). Because a mobile station 106 may use only one time slot in any data frame, it must transmit any information within 577 microseconds.

As shown in FIG. 2, a data frame 202 has eight time slots 204 (or physical channels). The time slots 204 carry bit-oriented control information, voice information, or data. Generally, the first time slot of each frame 206 holds bit-oriented control information. Control information is used in a GSM-based system to broadcast synchronization information and system parameters and options, to notify mobile stations 106 of pending telephone calls or page messages, and to grant mobile stations 106 access to other physical channels.

The time slots carrying control information are formatted in groups of 51 time slots (i.e., the first time slot of each of 51 successive frames) referred to as a multiframe 208. Downlink information transmitted to a mobile station 106 by a base station 104 is formatted in multiframes 208. In accordance with the GSM standard, a multiframe 208 may include four types of control information: (1) a frequency correction channel 210 (FCCH) which provides the mobile station 106 with the frequency reference of the GSM system; (2) a synchronization channel 212 (SCH) which supplies the mobile station with the key (or training sequence) it needs to be able to demodulate the information coming from the base station 104 and also contains a frame number, as well as the base transceiver station identity code (BSIC); (3) a broadcast control channel 214 (BCCH) which informs the mobile station 106 about specific system parameters it may need to identify the network or to gain access to the network (e.g., location area code, operator identification, information on which frequencies the neighboring cells may be found, different cell options, and access other parameters); and (4) a common control channel 216 (CCCH) which supports the establishment of a link between a mobile station 106 and a base station 104.

A common control channel 216 CCCH may have different uses. A common control channel 216 may be a paging channel 218 (PCH), which provides information indicating whether a telephone call or paging message is currently pending for a particular mobile station 106. A common control channel 216 may also be an access grant channel (AGCH) through which a mobile station 106 acquires information identifying another channel to use for its communication needs.

The frequency correction channel 210 FCCH and the synchronization channel 212 SCH each consist of bit-oriented data in a single time slot. The broadcast control channel 214 BCCH, however, as well as the common control channel 216 CCCH each use four time slots to carry information. In particular, a common control channel 216 CCCH used as a paging channel 218 PCH uses four time slots of bit-oriented data 220, each time slot carrying 156.25 bits.

Figure 3:
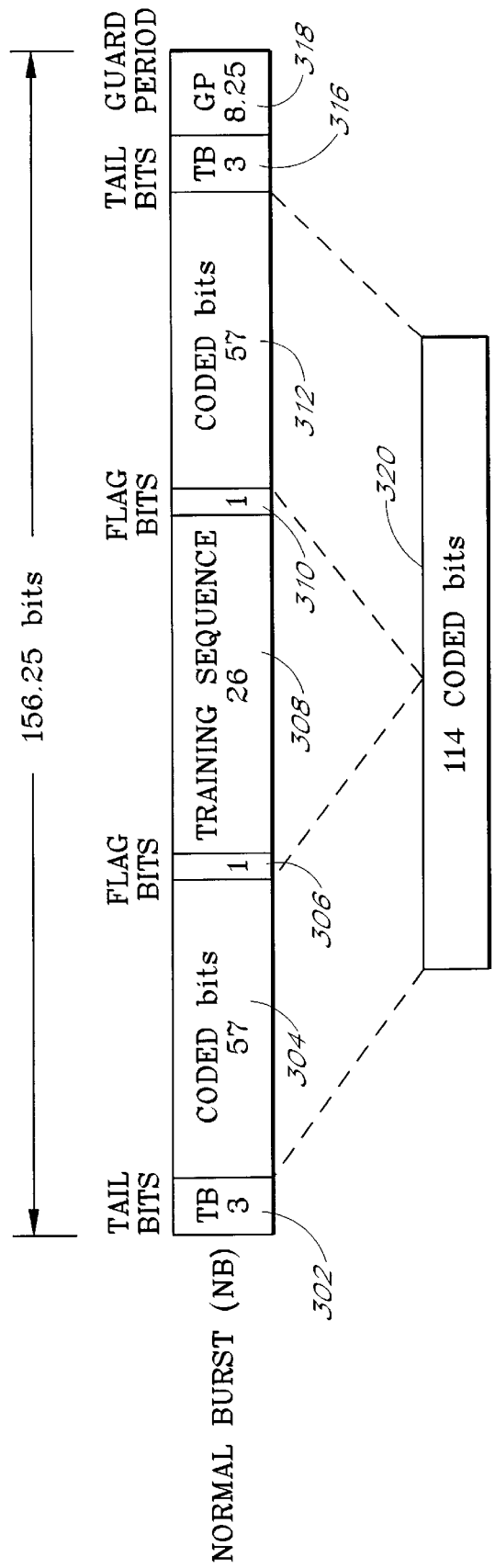
FIG. 3 illustrates a mapping of bits in a single paging channel (PCH) time slot.

FIG. 3 illustrates a mapping of bits in a single paging channel (PCH) time slot. As provided in the GSM specification, bits in a paging channel PCH time slot may be allocated as follows: Three tail bits 302, followed by 57 coded bits 304, followed by one flag bit 306, followed by 26 training sequence bits 308, followed by one flag bit 310, followed by 57 coded bits 312, followed by three tail bits 316, and terminated by an 8.25-bit guard period 318. Those of ordinary skill in the art may recognize this bit mapping as a normal burst. The guard period represents a period of time, approximately 30.4 microseconds, during which a mobile station ramps up RF power, and no information is conveyed by the guard period. The tail bits 302, 316 are also used to provide guard time and facilitate additional time for RF power ramping. The flag bits 306, 310 and the training sequence bits 308 contain no actual paging channel information, and instead are used for synchronization.

The paging channel information is contained in the first 57 coded bits 304 and the second 57 coded bits 312 which combine to form 114 coded bits 320. Thus, there are 114 coded bits representing paging channel information in each time slot of a paging channel (PCH). As FIG. 2 illustrates, the four time slots of a paging channel carry four groups of 114 coded bits, resulting in a total of 456 coded bits per paging channel (PCH).

Figure 4:
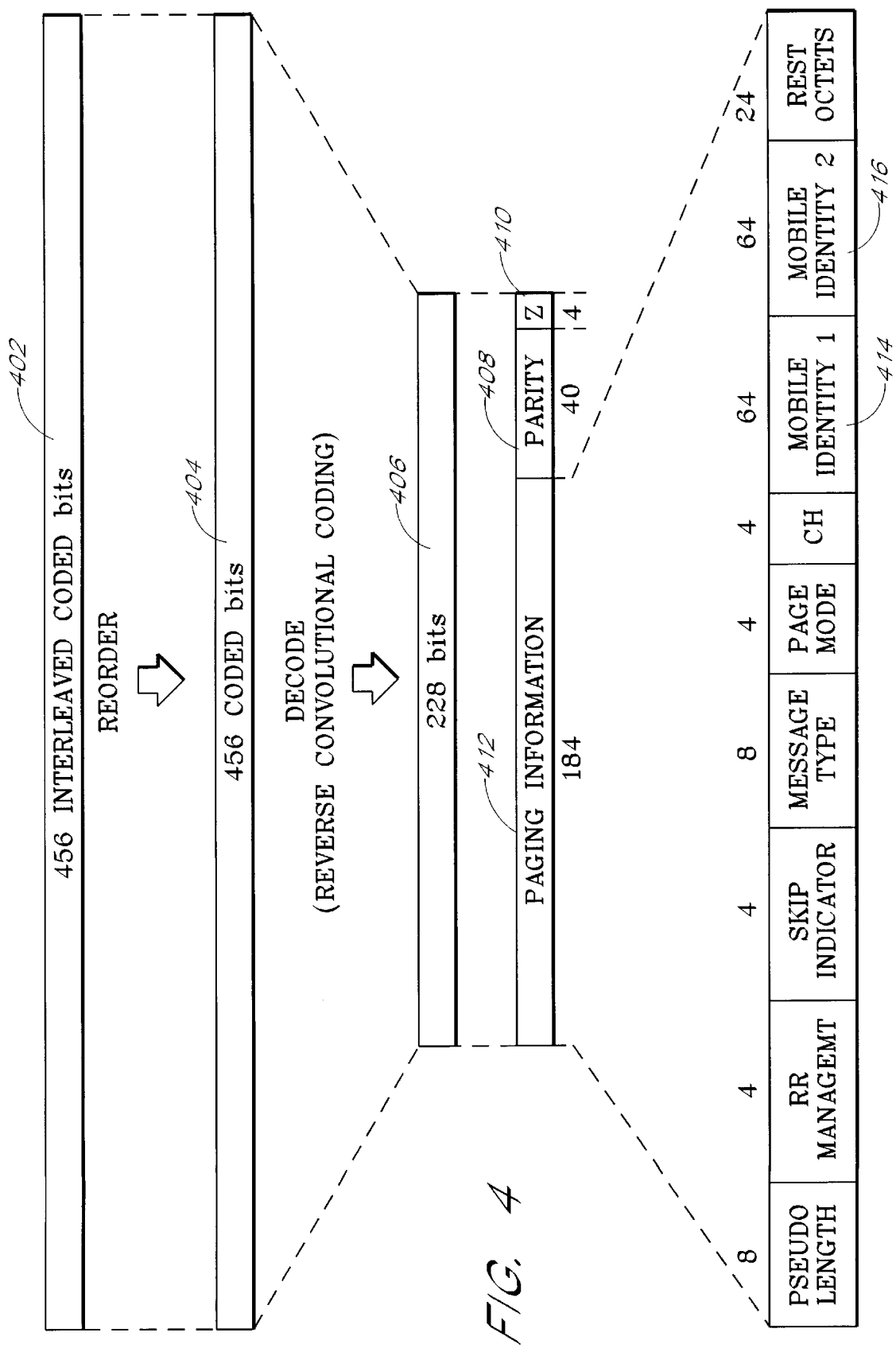
FIG. 4 illustrates a mapping of 456 coded bits comprising a paging channel.

FIG. 4 illustrates the mapping of the 456 coded bits carried by each paging channel. Those of ordinary skill in the art will appreciate that the 456 coded bits of the paging channel are interleaved 402. Generally, bit-oriented data may be interleaved to assist in detection and correction of transmission-related errors in received bit-oriented data. The interleaving of bit-oriented data is well known but complicated and is not discussed in detail herein. See Siegmund M. Redl, et al., *An Introduction to GSM*, 123 (1995) for more details. Meaningful information cannot be extracted from interleaved data, such as the 456 interleaved coded bits, until they are reordered. Because of the nature of the interleaving, it will be appreciated that the 456 interleaved coded bits cannot be reordered until all of the 456 interleaved coded bits have been received and stored by a mobile station 106.

Under the GSM standard, a mobile station 106 typically receives four time slots of bit-oriented data in a paging channel PCH, comprising a total of 625 bits (4*156.25= 625). Using known techniques, the mobile station 106: (1) eliminates the tail bits 302, 316, the flag bits 306, 310, the training sequence bits 308, and the guard period bits 318 from the bits of each time slot to isolate the 456 interleaved coded bits 402; (2) reorders the 456 interleaved coded bits yielding a bit stream comprising 456 coded bits 404; and (3) decodes the 456 coded bits to reverse the convolutional coding performed prior to transmission of the paging channel information to derive 228 bits 406.

The decoded 228 bits include 40 parity bits 408 to verify that the paging information has been received correctly and four zero bits 410 to reset a decoder. The mobile station 106 accesses paging information 412 contained in 184 bits. In particular, a mobile station 106 accesses either a first 64-bit mobile identity value 414 or a second 64-bit mobile identity value 416 (it is predetermined whether the mobile station will examine the first or second mobile identity) to determine whether a telephone call or paging message was directed to the mobile station 106. The mobile station 106 determines a telephone call or paging message was directed to the mobile station 106 by comparing the accessed mobile identity value to an internally stored identification code. Thus, under GSM specifications, when the mobile identity value 414, 416 matches the internally stored identification code, the mobile station 106 determines that a telephone call or paging message was directed to the mobile station 106.

Figure 5:
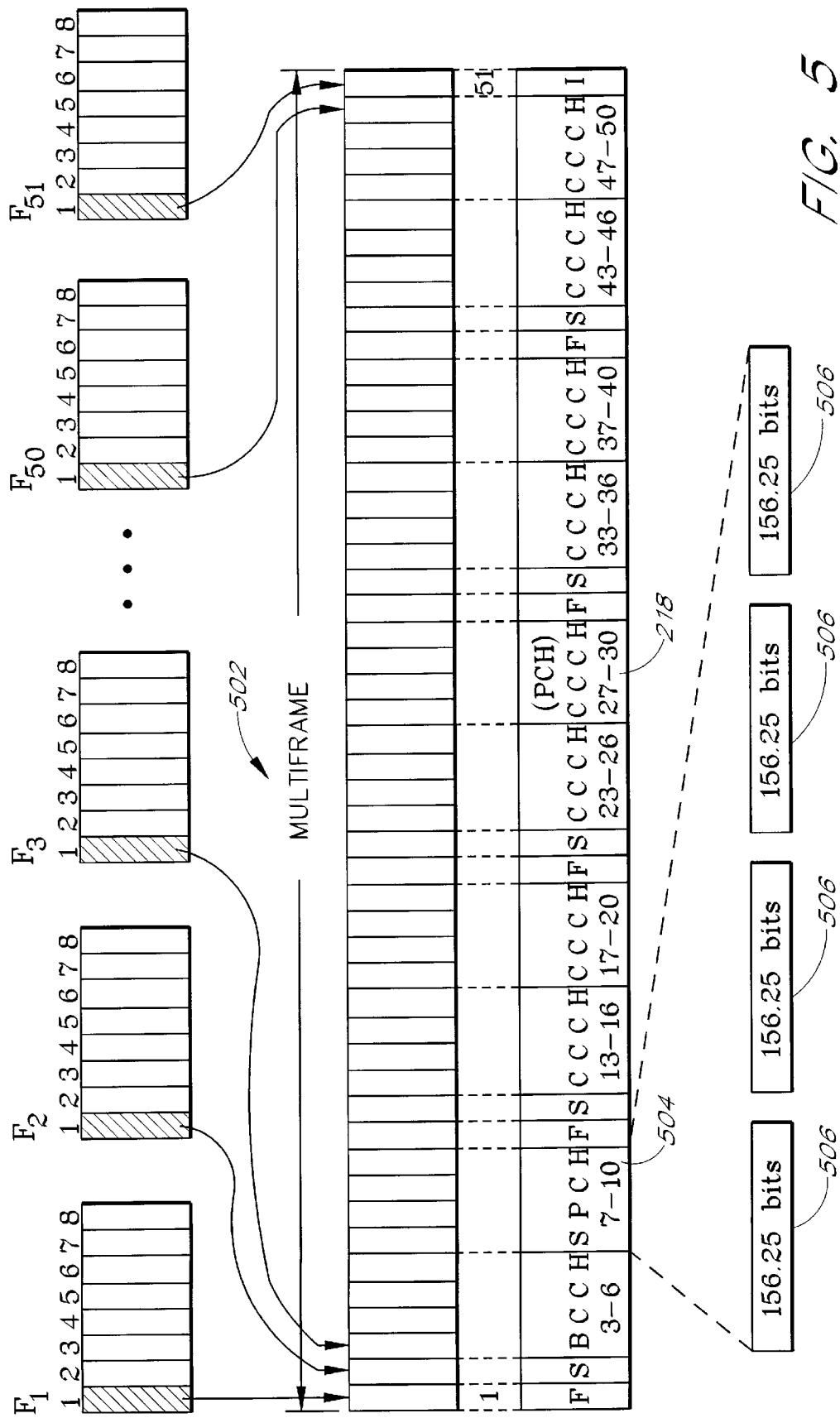
FIG. 5 illustrates a multiframe in accordance with an embodiment of the present invention.

FIG. 5 illustrates a multiframe 502 in accordance with one embodiment of the present invention. In addition to carrying frequency correction channels 210 (FCCH), synchronization channels 212 (SCH), broadcast control channels 214 (BCCH), and common control channels 216 (CCCH), the multiframe 502 includes a short page channel 504 (SPCH). In one embodiment of the present invention, the short page channel 504 (SPCH) includes four time slots 506. Each time slot 506 of the short page channel (SPCH) contains information sufficient to alert at least one mobile station 106 that there may be a telephone call or paging message directed to the mobile station 106. Each time slot 506 of the short page channel 504 contains 156.25 bits.

In another embodiment of the present invention, the short page channel 504 SPCH is implemented as another type of common control channel 216 CCCH. Thus, in that embodiment, any common control channel 216 CCCH could be allocated as one of the following: a paging channel 218 PCH, an access grant channel AGCH, or a short page channel 504 SPCH.

Figure 6:
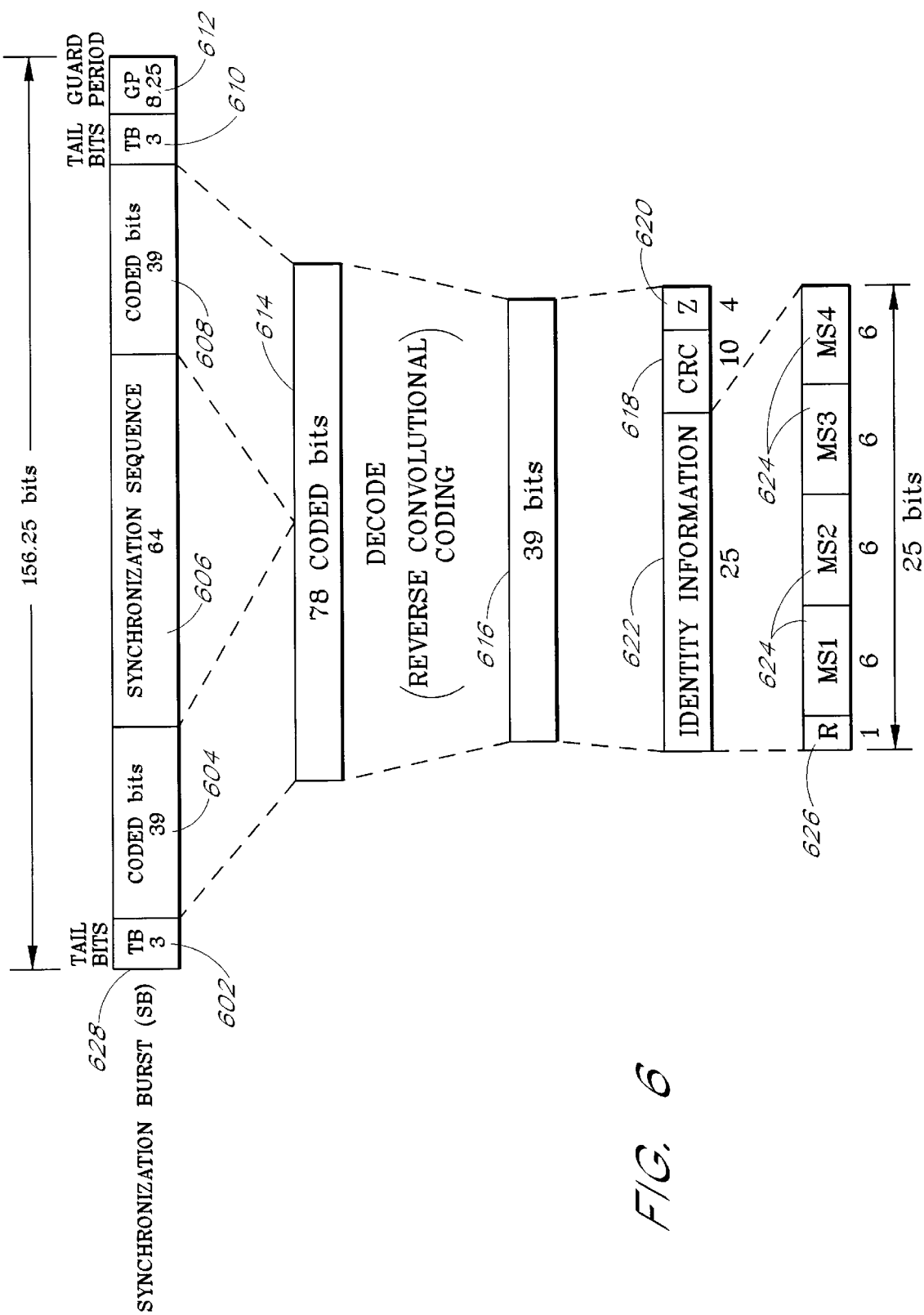
FIG. 6 illustrates a mapping of bits in one embodiment of a short page channel (SPCH) time slot.

FIG. 6 illustrates the mapping of bits in one embodiment of a short page channel (SPCH) time slot. A mobile station 106 monitoring a time slot 506 of the short page channel 504 receives three tail bits 602, 39 coded bits 604, 64 synchronization sequence bits 606, 39 coded bits 608, three tail bits 610, and a guard period region 612 of 8.25 bits. Those of ordinary skill in the art may recognize that a synchronization burst format is being used. While alternative embodiments of the present invention operate using different time slot formats, the synchronization burst format reduces the timing precision required to receive a short page channel time slot 506. The reduced timing precision requirements are exploited to reduce power consumption, as is explained in more detail further below.

In accordance with the present invention, a single time slot 506 of the short page channel 504 alerts a mobile station 106 of a possible pending telephone call or paging message. Thus, there is no need for a mobile station 106 to receive multiple time slots of a short page channel SPCH and thus no need to detect or correct bit transmission errors over multiple time slots. Accordingly, the bits of each short page channel time slot need not be interleaved with bits of other time slots, in which case a mobile station 106 need perform no reordering of received bits of a short page channel time slot. In another embodiment of the present invention, the 78 bits in a short page channel time slot may be interleaved according to well known interleaving schemes to facilitate detection and correction of bit transmission errors affecting the bits in a time slot.

Regardless of whether the bits are interleaved, the mobile station 106 need not wait to receive any additional time slots. Rather, as discussed below, the mobile station 106 may process the bit data in a single short page channel time slot 628 to determine whether there may be a telephone call or paging message directed to the mobile station 106.

To detect the potential presence of a telephone call or paging message, the mobile station 106 combines the 39 coded bits 604 and the 39 coded bits 608 into a stream of 78 coded bits 614. Using known techniques, the mobile station 106: (1) reorders the 78 coded bits if they were interleaved; (2) decodes the 78 coded bits to reverse the convolutional coding performed prior to transmission of the short page channel time slot to derive 39 bits 616; (3) verifies the correct receipt of 25 bits of identity information 622 by examining a 10-bit cyclic redundancy check (CRC) 618 placed in the time slot by the mobile switching center 102 during generation of the short page channel information; and (4) uses four zero bits 620 to reset a decoder. The 25 bits include four 6-bit fields that may contain mobile station identity values 624 and one reserved bit 626.

Each of the four six-bit fields may contain an identity value corresponding to one or more mobile stations 106. To scan for telephone calls or paging messages, each mobile station 106 examines a predetermined, six-bit field to check for a short page identity match (described in more detail below). More than one mobile station 106 may examine the same six-bit field, and more than one mobile station 106 may derive a short page identity match and be alerted to a possible telephone call. Each alerted mobile station 106 then examines standard paging channel (PCH) information according to standard GSM specifications to determine whether the telephone call or paging message is intended for the respective mobile station 106. If not, the mobile station 106 resumes scanning of short page channels (SPCH).

In one embodiment of the present invention, the mobile station 106 examines one of four 6-bit mobile station identity values 624 to determine whether a telephone call or paging message was directed to the mobile station 106. Those of ordinary skill in the art will appreciate that six bits may not uniquely identify a mobile station from other mobile stations 106 simultaneously using a GSM network. It will be appreciated, however, that because each short page channel contains four time slots and because each time slot contains four 6-bit values 624, only one out of every 16 mobile stations may be examining the same 6-bit value. This is because each mobile station 106 may be assigned one of the four time slots of a short page channel 504 and may further be assigned one of the four 6-bit values 624 within the assigned time slot. It will further be understood that the range of a 6-bit value (0–63) is sufficient to identify 64 different mobile stations 106. The embodiment illustrated in FIG. 6 thus suffices to uniquely identify any one of 64 different mobile stations 106 within any one of 16 different groups of mobile stations 106. In other words, the embodiment illustrated in FIG. 6 can uniquely alert one out of each 1,024 mobile stations 106 of a pending telephone call or paging message.

One of ordinary skill in the art will appreciate that the 25 bits of identity information 622 could be allocated differently. For example, three 8-bit fields may contain mobile station identifier values along with one reserved bit. As another example, six four-bit fields may contain mobile station identifier values along with one reserved bit. Alternatively, the 24 bits could be allocated to a single mobile station identifier value, providing the ability to uniquely identify over 16 million mobile stations 106. However, including four six-bit fields in a single time slot 506 strikes an advantageous balance in providing for a sufficient number of potential call alerts while, at the same time, minimizing the additional load on the physical control channel caused by introducing another logical channel (the SPCH channel) and also minimizing the number of false alerts.

In alternative embodiments of the present invention, short page time slots may have fewer than or more than 25 bits of identity information. For example, one embodiment of a short page time slot includes only 26 synchronization bits and an additional 38 coded bits. Thus, following any interleave-required reordering and following decoding to reverse convolutional coding, this embodiment provides 44 bits (25+19=44) of identity information. The 44 bits could be divided up many different ways to represent mobile station identifiers, such as five 8-bit fields for mobile station identifiers and four reserved bits. However, regardless of how many bits are allocated to identity information, the mobile station 106 need only receive, store and process the bit-oriented data of a single time slot to be alerted to the possibility that a telephone call or paging message has been directed to the mobile station 106.

According to existing GSM-based wireless communication systems, mobile stations receive, store and process four time slots of a paging channel (PCH) to determine whether a telephone call or paging message is pending. Under the present invention, a mobile station 106 in standby mode (waiting for a telephone call or paging message) need never process more than a single time slot to detect the possibility that a telephone call or paging message has been directed to the mobile station 106. The amount of data in a short page (SPCH) time slot of the present invention is only 25% of the amount of data in a four-time slot PCH, and the SPCH time slot may be received in just 25% or less of the time period required to receive the four-time slot PCH. Moreover, the SPCH time slot may be processed by the mobile station 106 in around 25% of the time required to process a four-time slot PCH.

The reduced receiving time and processing time for an SPCH time slot directly reduces the battery power consumption of a mobile station 106 in standby mode. The amount of battery power consumed by a mobile station 106, for example, a cellular telephone, to receive and process a single time slot of a short page channel (SPCH) is approximately 25% of the power consumed by the same mobile station 106 to receive and process four time slots of standard paging channel (PCH) information. Thus, use of the short page channel SPCH may quadruple the standby mode lifetime of a mobile station battery.

Figure 7:
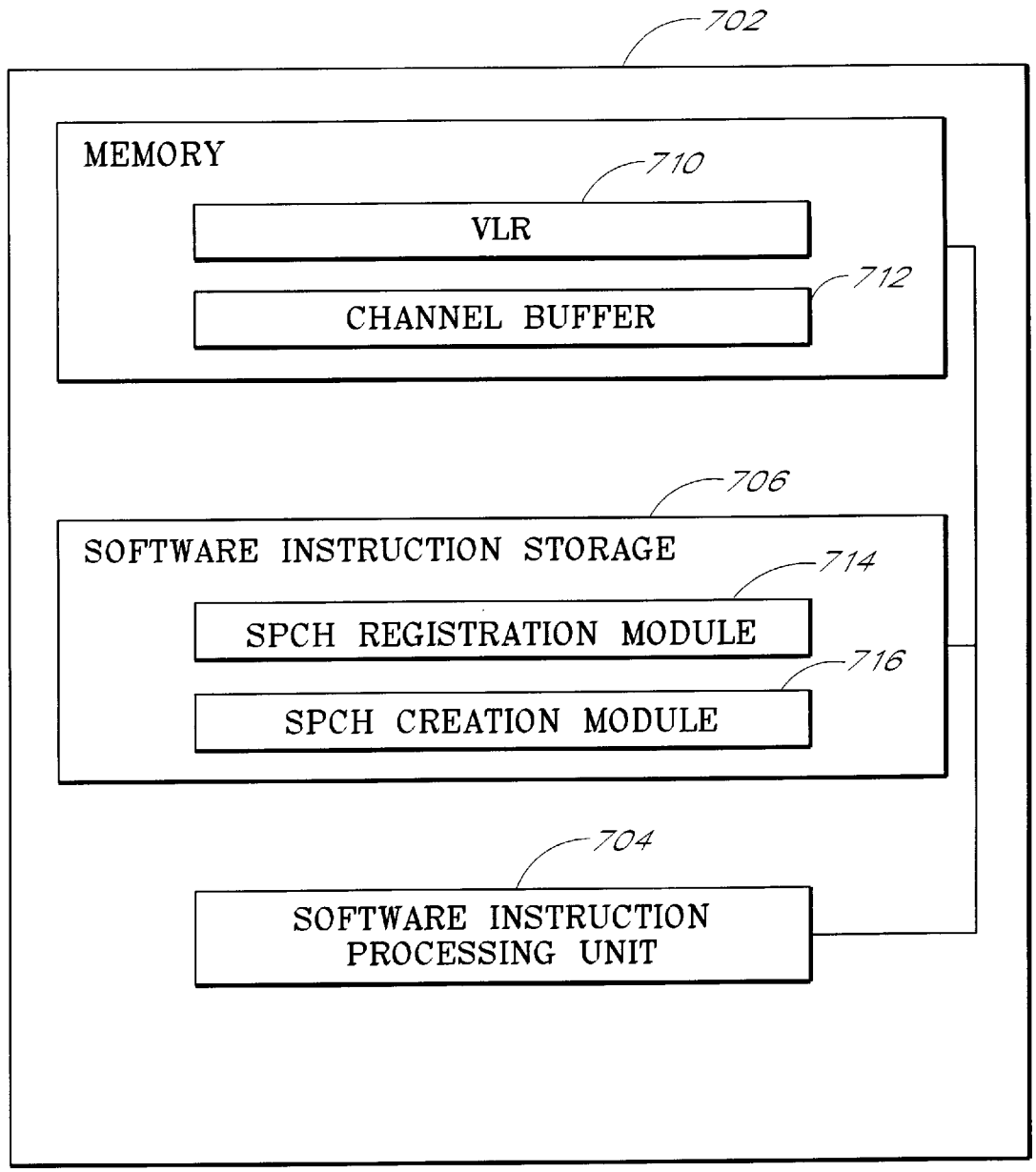
FIG. 7 illustrates components of a mobile switching center in accordance with an embodiment of the present invention.

FIG. 7 illustrates components of a mobile switching center 702 according to one embodiment of the present invention. A software instruction processing unit 704 loads and processes executable software instructions stored in a software instruction storage 706. The software instruction storage 706 may be any computer-readable storage media, including a programmable read-only memory (PROM) device or a hard disk drive. The software instruction storage includes an SPCH registration module 714 and an SPCH creation module 716. The software instruction processing unit 704 reads data values from and writes data values to a memory 708 which may be any type of computer-readable memory which allows an instruction processing unit to write and store data values into the memory. One such memory 708 is a standard hard disk. The memory 708 includes a visitor location register 710 (VLR) which organizes and stores information identifying characteristics about particular mobile stations 106. The software instruction processing unit 704 executes instructions of the SPCH registration module 714 to store information in the VLR 710 including identity information and channel assignment information for a mobile station 106. The memory 708 also includes one or more channel buffers which store data received from mobile stations 106 or which store data to be transmitted to mobile stations 106. The software instruction processing unit 704 executes instructions of the SPCH creation module to generate a short page channel SPCH for transmission to mobile stations 106 via a base station 104.

Figure 8:
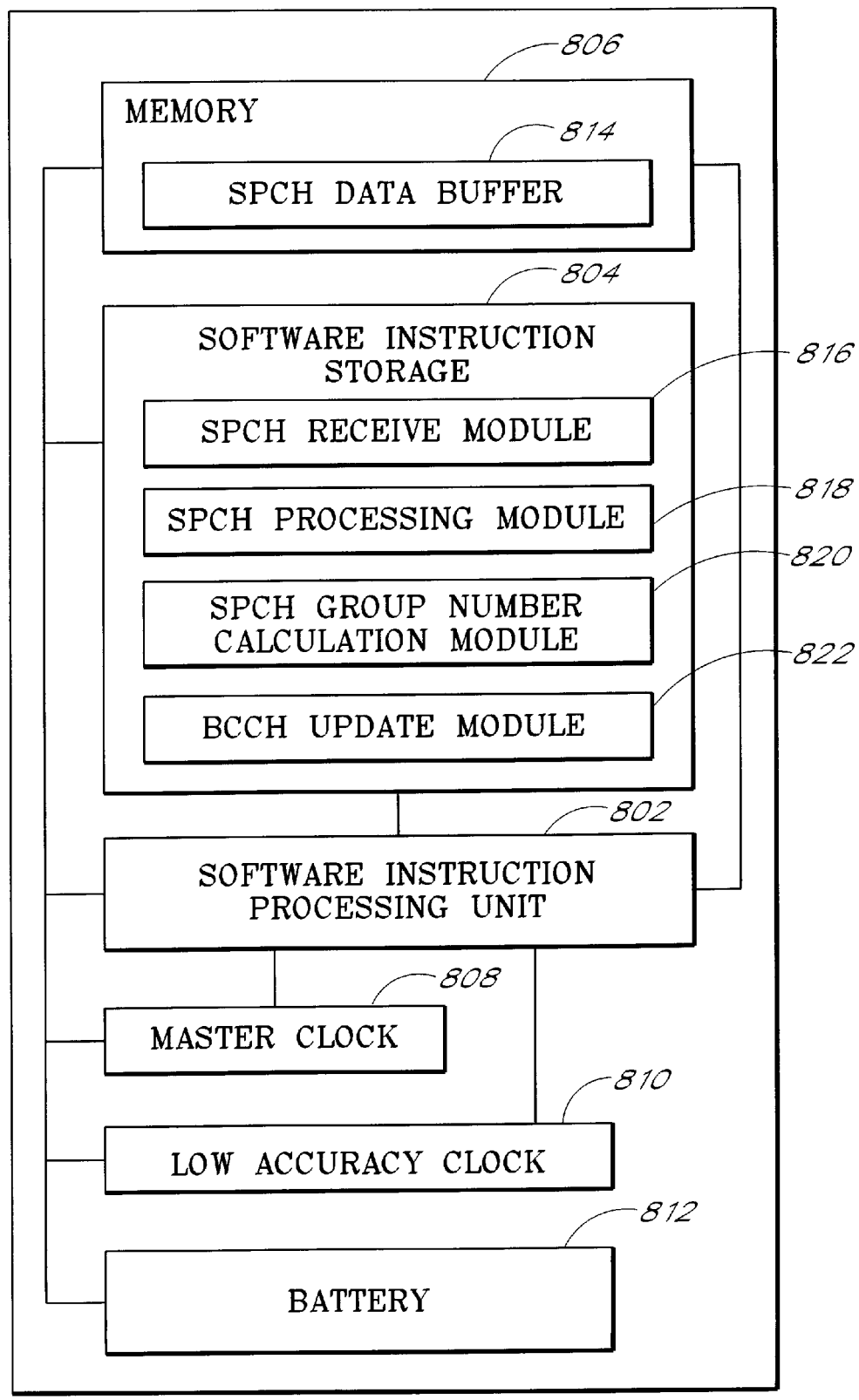
FIG. 8 illustrates components of a mobile station in accordance with an embodiment of the present invention.

FIG. 8 illustrates components of a mobile station 106 according to one embodiment of the present invention. A software instruction processing unit 802 loads and executes instructions stored in a software instruction storage 804. The software instruction storage 804 may be any type of computer-readable medium such as a PROM or an erasable PROM (EPROM). The software instruction processing unit 802 reads data values from and stores data values to a memory 806 which may be any type of computer-readable medium permitting a processor to write and store data values into the memory 806. A master clock 808 times the execution of software instructions by the software instruction processing unit 802. In one embodiment of a mobile station 106, a low accuracy (or low precision) clock 810 also times instructions executed by the software instruction processing unit 802. The low accuracy (or low precision) clock is preferably one that consumes less power than the master clock 808 ordinarily used. This may advantageously be accomplished by using a clock having a lower clock speed or a lower frequency than the master clock 808. In such a case, it can be seen that the master clock 808 and its associated circuitry would do more processing and consume more power than the low accuracy clock 810. The low accuracy (or low precision) clock 810 may thus consume less power because it need not have the stability or resolution that the master clock needs. A battery 812 provides power to components of the mobile station 106, including the software instruction processing unit 802, the master clock 808, and the low accuracy clock 812.

An SPCH data buffer 814 contains short page channel time slot data received by the mobile station 106. The software instruction processing unit 802 executes instruction of an SPCH receiving module 816 to control the receipt of short page channel time slot data transmitted by a base station 104. The SPCH receiving module 816 is stored in the software instruction storage 804. Also stored in the software instruction storage 804 is an SPCH processing module 818.

The software instruction processing unit 802 executes instructions of the SPCH processing module 818 to process information in the SPCH data buffer 814 to detect call alerts.

Those of ordinary skill in the art will appreciate that instructions of software modules, such as the SPCH receive module and the SPCH processing module, may be combined into a single module. Moreover, it will be appreciated that modules stored in the software instruction storage 804, as illustrated in FIG. 8, are not exclusive, and that other modules, particularly those existing in the art such as modules for receiving and processing paging channels 218 PCH, may be stored in addition to those illustrated in FIG. 8.

While battery power is conserved by minimizing the processing of paging channels PCH having four time slots each, battery power is further conserved by avoiding unnecessary processing of other logical channels such as the broadcast control channel 214 BCCH. The mobile station 106 receives and processes the reserved bit 626 included in a short page channel SPCH time slot 506 to avoid redundant processing of a BCCH channel.

In existing GSM systems, mobile stations in standby mode now monitor broadcast control channels 214 (BCCH) in accordance with GSM specifications to receive updated information, including possible changes in communication parameters. Currently, mobile stations monitor a broadcast control channel (BCCH) at least once every 30 seconds, thus accessing a BCCH in approximately one of every 120 multiframes.

In one embodiment of the present invention, when the mobile station 106 receives a first short page channel (SPCH) time slot, the software instruction processing unit 802 executes instructions of the broadcast control channel (BCCH) update module 822 to store the value of the reserved bit in computer-readable memory, such as a flash memory, either internal to the mobile station 106 or on a SIM card. When the mobile station 106 receives the next short page channel (SPCH) time slot, instructions of the broadcast control channel update module 822 compare the value of the newly received reserved bit to the value of the stored bit. The two values will differ when the content of the broadcast control channel (BCCH) differs from a prior transmitted broadcast control channel. The mobile station 106 need not scan for or process any broadcast control channel until the content of the broadcast control channel changes. Eliminating the processing of redundant broadcast control channels BCCH reduces processing requirements during standby mode operation and hence conserves battery power. In alternative embodiments, more than one bit may be reserved for indicating to the mobile station 106 that there is some reason to scan for and receive particular broadcast data.

Operation Of One Embodiment Of The Invention

In operation, in accordance with one embodiment of the invention, a mobile station 106 is powered on inside a cell 108. The mobile station 106 scans GSM frequencies to synchronize with the transmission from a base station 104. Once synchronization is established (a frequency correction channel 210 FCCH, a synchronization channel 212 SCCH, and a broadcast control channel 214 BCCH have been received and processed), the mobile station 106 registers with the mobile switching center 102 associated with the cell in which the mobile station 106 is located. During registration, the mobile switching center 102 generates a temporary mobile subscriber identity (TMSI) and a short page identifier (SPI). These are recorded in a visitor location register (VLR) along with the cell location of the mobile station 106. The mobile switching center 102 transmits the TMSI value and the SPI value to the mobile station 106 which stores them and then transmits an acknowledgment of its receipt of those values back to the mobile switching center 102. The mobile switching center 102 also assigns the mobile station 106 to a certain paging group and to a certain short paging group. The paging group value determines which portions of a base station 104 transmission the mobile station 106 will receive and process to detect telephone calls or paging messages. Similarly, the short paging group number determines which portions of a base station 104 transmission the mobile station 106 will receive and process to detect call alerts. The mobile switching center 102 transmits the paging group number and the short paging group number to the mobile station 106 which acknowledges its receipt of those values in a return message.

The mobile station 106, in a cell 108, then enters standby mode processing wherein it scans base station 104 transmissions for call alerts. The base station 104 transmits multiframes at the rate of one approximately every 0.25 seconds. The mobile switching center 102 creates multiframes and includes a short page channel 504 in each multiframe 502. Each short page channel 504 SPCH advantageously has four time slots 506 (although a single time slot alerts a mobile user to potential telephone calls or paging messages). The mobile switching center 102 sends each multiframe it creates to a base station 104 for transmission in a cell 108.

Depending on the mobile station's 106 short paging group number, it will receive and process a certain time slot of the short page channel 504 in selected multiframes 502. For example, the mobile station's 106 short paging group number may specify that the mobile station 106 may detect call alerts by receiving and processing the second time slot of the short page channel 504 of every second multiframe 502. Thus, because a multiframe 502 is transmitted every 0.25 seconds, the mobile station 106, receiving a time slot from every second multiframe 502, detects possible call alerts every 0.5 seconds.

Figure 15:
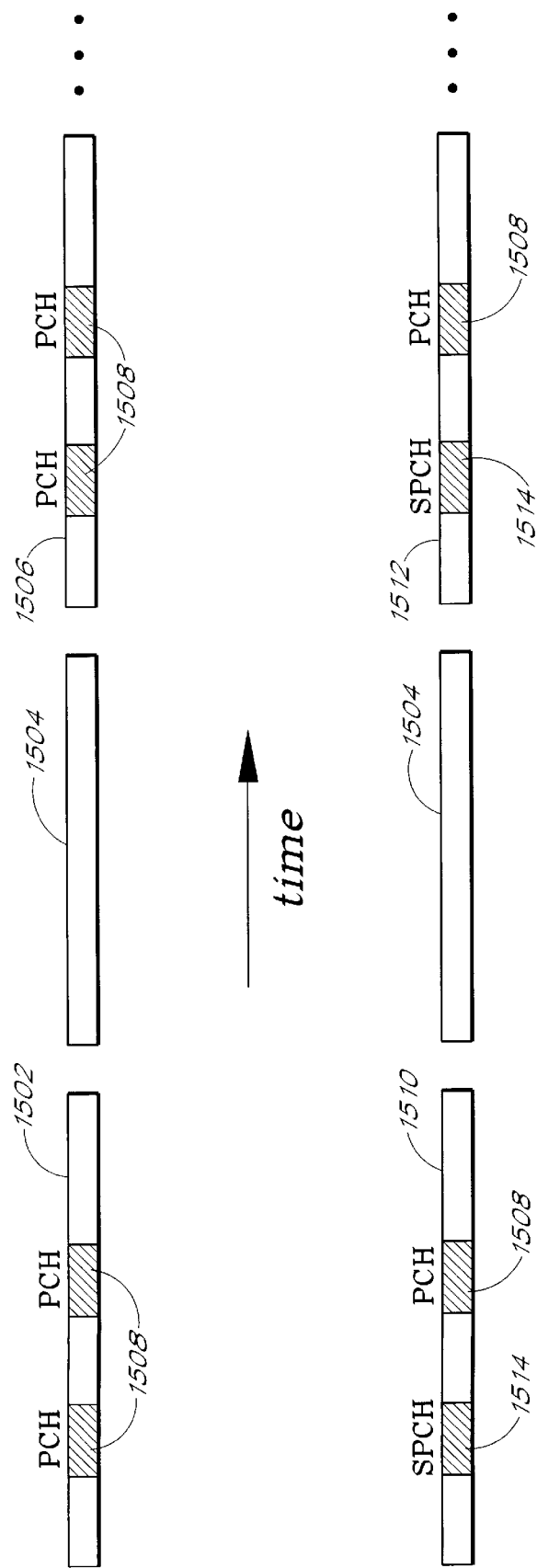
FIG. 15 illustrates two sequences of multiframes, one sequence being used by existing GSM-based systems having no short page channels SPCH and another sequence in accordance with a preferred embodiment of the present invention using short page channels 504 SPCH.

FIG. 15 illustrates two sequences of multiframes, one sequence being used by existing GSM-based systems having no short page channels 504 SPCH, and another sequence in accordance with a preferred embodiment of the present invention using short page channels 504 SPCH. A first sequence of multiframes illustrates the use of two paging channels 1508 PCH in every other multiframe. Thus, a first multiframe 1502 includes first and second paging channels 1508. A second multiframe 1504, transmitted after the first multiframe 1502, includes no paging channels for the mobile station 106, but the second multiframe 1504 may include paging channels for other mobile stations. A third multiframe 1506 again includes first and second paging channels 1508. The first sequence of multiframes (illustrated by three consecutive multiframes 1502, 1504, 1506) permits a mobile station 106, according to existing GSM standards, to receive and process a paging channel 1508 PCH every 0.5 seconds by receiving and processing one full paging channel 1508 in every other multiframe (each multiframe has a transmission duration of approximately 0.25 seconds).

A second sequence of multiframes 1510, 1504, 1512 illustrates the transmission of a short page channel 1514 in accordance with a preferred embodiment of the present invention. A multiframe 1510 includes one short page channel 1514 SPCH and one paging channel 1508 PCH. Another multiframe 1504, transmitted approximately 0.25 seconds after the multiframe 1510, includes no short page channels for the mobile station 106 and includes no paging channels for the mobile station 106, but the multiframe 1504 may include short page channels and paging channels for other mobile stations. Another multiframe 1512, transmitted after the multiframe 1504, again includes one short page channel 1514 SPCH and one paging channel 1508 PCH. The second sequence of multiframes 1510, 1504, 1512 permits a mobile station 106 to receive and process one time slot of a short page channel 1514 SPCH every 0.5 seconds.

As another example, the mobile station's 106 short paging group number may specify that the mobile station 106 receives and processes a time slot of a short page channel 504 once every eight multiframes 502. In that case, the mobile station 106 detects possible call alerts approximately every two seconds.

Each time slot of a short page channel 504 includes four 6-bit mobile station identifier values 624. The mobile station's 106 short paging group number also specifies which of the four 6-bit mobile station identifier values 624 the mobile station 106 should examine to detect a call alert. For example, a mobile station's 106 short paging group number may specify that a mobile station 106 examines the third 6-bit mobile station identifier value 624 in a short page channel SPCH time slot. Thus, to detect a call alert (to determine whether a telephone call or paging message may have been directed to the mobile station 106), the mobile station 106 compares the value of the third 6-bit mobile station identifier value 624 to the internally stored SPI value. If that compare operation results in a match, then the mobile station 106 begins receiving and processing standard paging channels 218 to determine if the mobile station 106 is the intended recipient of the telephone call or paging message.

In accordance with the GSM standard, the mobile station 106 receives and processes standard paging channel 218 PCH information approximately every 0.5 to 2 seconds. Just as with the short paging group number, a mobile station's 106 paging group number determines the frequency at which the mobile station 106 will receive and process each page channel 218 PCH and also which paging channel 218 PCH, of potentially many, in a multiframe 502 the mobile station 106 should access.

When the mobile station 106 receives a paging channel 218, it receives four time slots of information. To detect whether the mobile station 106 was the intended recipient of a telephone call or paging message, the mobile station 106 decodes the four time slots and compares a mobile identity value 414 included in the four time slots to an internally stored value. If a match is detected, then the mobile station 106 carries out the standard GSM call establishment procedures. If there is no match, then the mobile station 106 returns to standby mode processing wherein it scans short page channel 504 information for call alerts and advantageously avoids consuming large amounts of battery power to receive and process standard paging channels PCH.

While in standby mode processing, the mobile station 106 advantageously enters an idle state between the receipt and processing of a short page channel 504 SPCH time slot and shuts down the master clock. Because each time slot of a short page channel 504 SPCH includes 64 synchronization bits, the short page channel 504 time slot may be easily locked onto (synchronized) and recognized. The synchronization bits thus reduce the precision in timing needed to receive the short page channel 504 SPCH time slot. Accordingly, a low precision clock is used to time the idle state rather than the more precise master clock. Shutting down the master clock in the idle state conserves battery power as the low precision clock consumes far less power than the master clock. When the idle state expires, the master clock is started and stabilized in time to receive the next short page channel SPCH time slot.

Upon receiving each short page channel 504 SPCH time slot, the mobile station 106 examines the value of a reserved bit included in the SPCH time slot. The mobile station 106 compares the value of the newly received reserved bit to the value of the reserved bit in the immediately preceding short page channel 504 SPCH time slot, which bit the mobile station 106 has stored in internal memory. When the reserved bits differ, there has been some change in the broadcast control channel 214 BCCH information, and the mobile station 106 then receives and processes the four time slots of the next broadcast control channel 214. Thus, use of the reserved bit to identify changes in the broadcast control channel information, allows the mobile station 106 to avoid receiving and processing redundant, unnecessary broadcast control channels 214 and thus to avoid unnecessary consumption of battery power. The mobile switching center 102 makes this possible by comparing the content of each new broadcast control channel 214 to the content of the immediately preceding broadcast control channel and adjusting the reserved bit in the short page channel 504 SPCH as necessary prior to transmission of the SPCH in a cell 108. Aspects of the foregoing operation description are discussed in more detail below.

Figure 9:
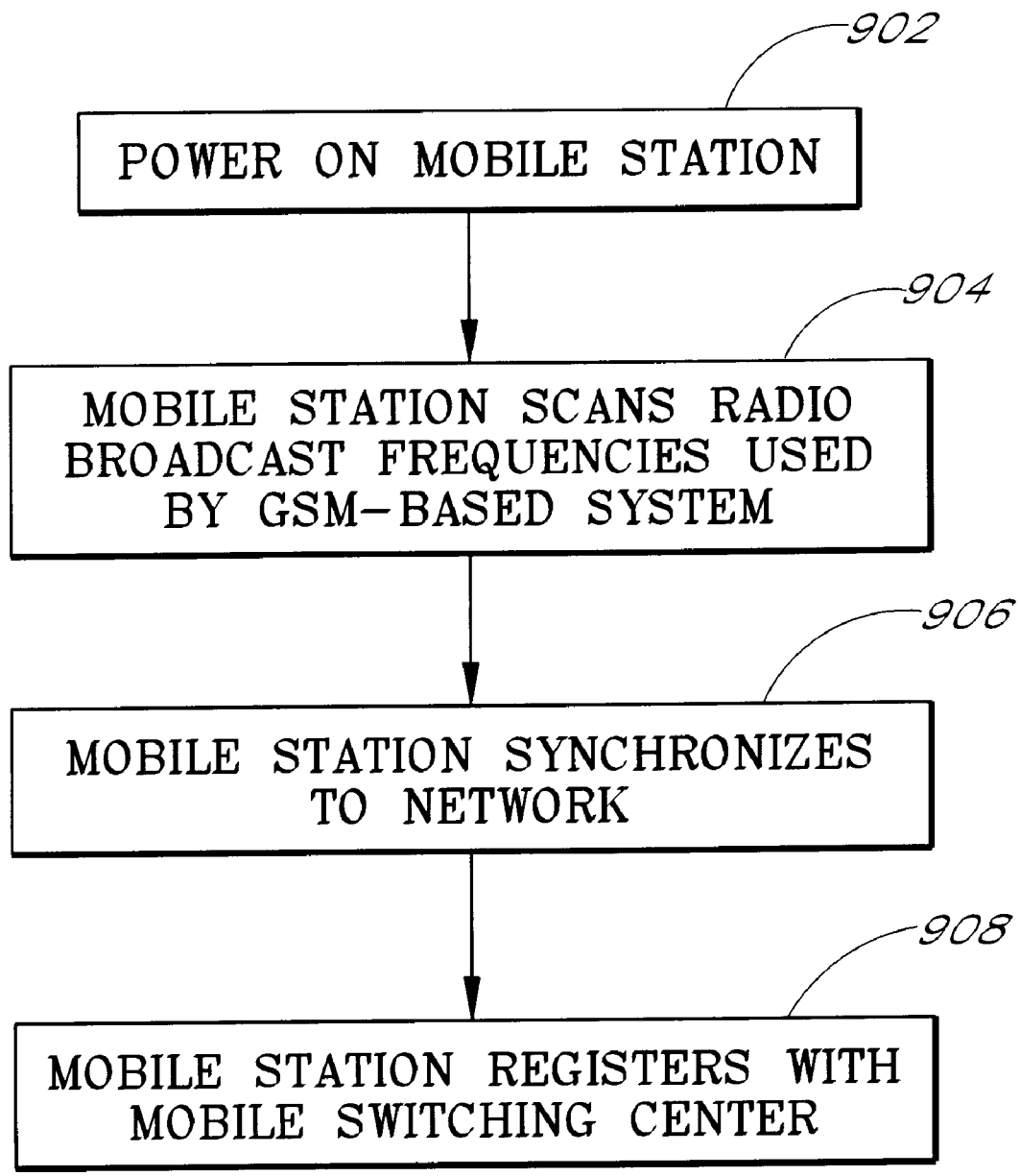
FIG. 9 illustrates steps performed by a mobile station to register with a mobile switching center in accordance with an embodiment of the present invention.

FIG. 9 illustrates steps performed by a mobile station 106 to register with a mobile switching center 102. In a first step 902, the mobile station 106 (e.g., a cellular telephone) is powered on. Next, in a step 904, the mobile station 106 scans radio broadcast frequencies used by a GSM-based wireless communication system. In a further step 906, the mobile station 106 synchronizes to the GSM network. Using known synchronization steps, the mobile station 106 first synchronizes to a frequency by scanning for a physical channel having the highest apparent power level. The mobile station 106, having located such a physical channel, searches for a frequency correction channel (FCCH) signal consisting of a sequence of zero-valued bits filling an entire time slot of the channel. The FCCH signal is a logical channel mapped to the first time slot of a data frame. As illustrated in FIG. 5, there may be five FCCH logical channels (each identified in FIG. 5 by "F") in a multiframe 502.

After locating a frequency correction channel FCCH, the mobile station 106 synchronizes timing by scanning for a synchronization channel (SCH) from which it obtains timing information such as, for example, a current frame number. Each SCH is a logical channel mapped to the first time slot of a data frame. As illustrated in FIG. 5, there may be five SCH logical channels (each indicated by an "S" in FIG. 5) in a multiframe 502. According to GSM specifications, the mobile station 106 also synchronizes to a base station 104 by scanning for a broadcast control channel (BCCH) to obtain information such as the location for the cell 108, cell options, as well as information on how to communicate with the base station 104. In still a further step 908, the mobile station 106 registers with the mobile switching center 102.

Figure 10:
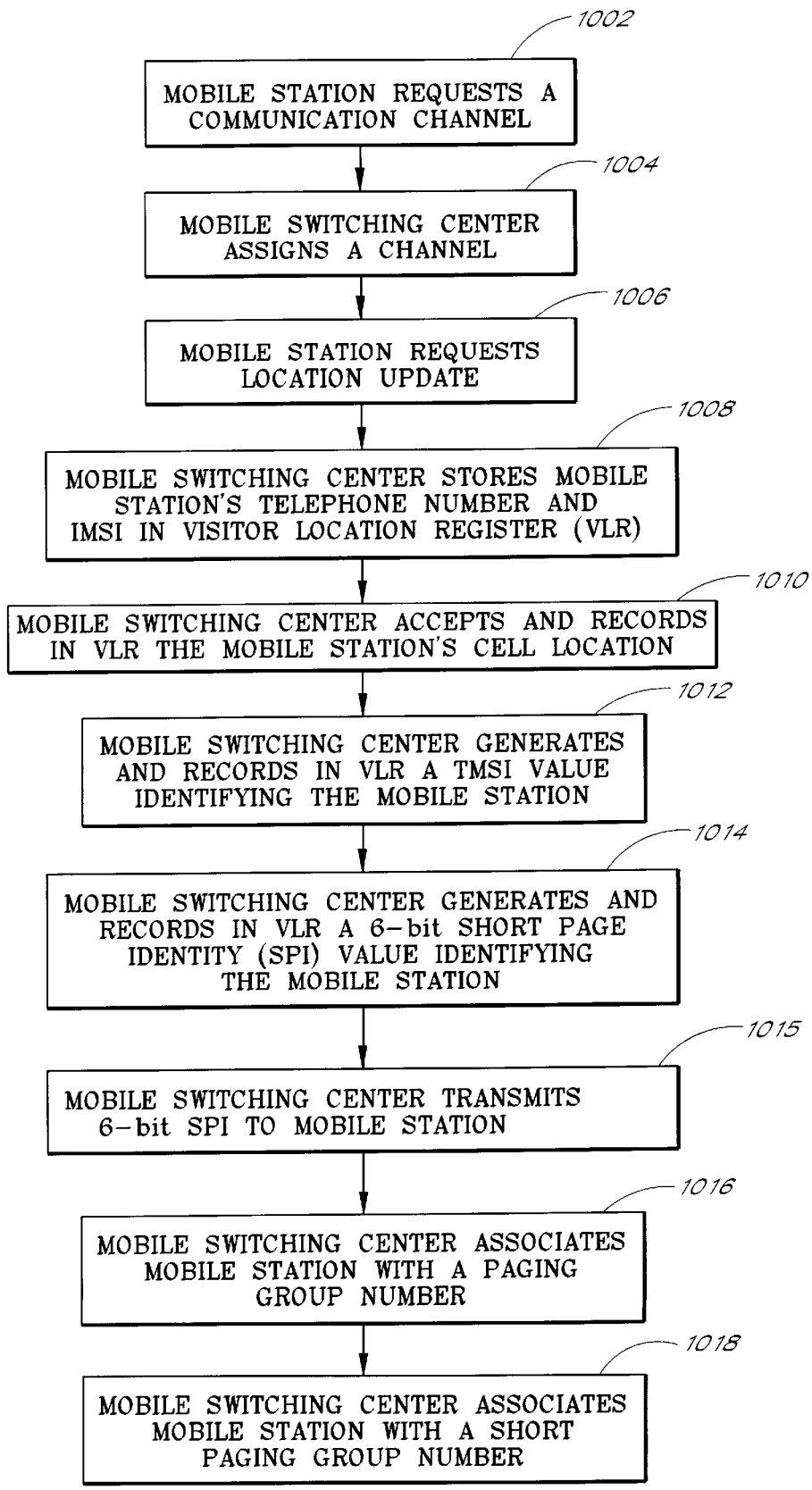
FIG. 10 illustrates steps performed by a mobile station and a mobile switching center to register and activate the mobile station in a cell in accordance with an embodiment of the present invention.

FIG. 10 illustrates steps performed by a mobile station 106 and a mobile switching center 102 to register and activate the mobile station 106 in a cell 108. In a first step 1002, the mobile station 106 requests a communication channel. In a next step 1004, the mobile switching center 102 assigns a channel for the mobile station 106 to use in completing the registration procedure. (See, for example, Siegmund M. Redl, et al., *An Introduction to GSM*, 40 (1995) which is hereby incorporated by reference herein in its entirety). In a further step 1006, the mobile station 106 requests a location update.

In a step 1008, the mobile switching center 102 stores the mobile station's 106 telephone number as well as the mobile station's 106 international mobile subscriber identity (IMSI) in a computer-readable storage area called a visitor location register (VLR). Those of ordinary skill in the art will appreciate that the IMSI number is a 60-bit value which uniquely identifies a mobile station and that, typically, the IMSI is stored on a subscriber identity module (SIM). A SIM is a smart card having computer-readable memory, the SIM card being inserted into a mobile station prior to the mobile station 106 being used in a cell. In a further step 1010, the mobile switching center 102 accepts and stores in the VLR the mobile station's 106 cell location.

In a step 1012, the mobile switching center 102 generates a 32-bit temporary mobile subscriber identity (TMSI) value. The TMSI is assigned to the mobile station 106 and used to identify the mobile station 106 while it is using the GSM network. The mobile switching center 102 stores the TMSI value in the VLR and transmits the TMSI value to the mobile station 106. The mobile station 106 acknowledges its receipt of the TMSI in a message it transmits back to the mobile switching center 102.

In one embodiment of the present invention, in a step 1014, instructions of the SPCH registration module 714 as executed by the software instruction processing unit 704 generate a 6-bit short page identity (SPI) value. The SPI may represent 6 bits from the TMSI value, or 6 bits from the IMSI value. Alternatively, the 6 bits may represent some transformation, such as a hash function combined with a modulo operation, performed on the TMSI or IMSI value. In still another embodiment, the 6 bits of the SPI may be selected by instructions of the SPCH registration module 714 completely independent of the TMSI and IMSI values for a mobile station 106, such as by incrementing a 6-bit counter and associating the resulting value with a registering mobile station 106 (setting the counter to 0 when incrementing the binary counter value 111111). In the step 1014, instructions of the SPCH registration module 714 associate the selected 6-bit SPI value with the mobile station 106 by storing the 6-bit SPI value in the VLR. It will be appreciated that if the 6-bit SPI value is generated based on some portion or transformation of the mobile station's 106 IMSI or TMSI number, then the 6-bit SPI need not be stored in the VLR and can be computed by the mobile switching center 102 or the mobile station 106 whenever needed.

In another step 1015, the mobile switching center 102 transmits to the mobile station 106 the selected 6-bit short page identity. The mobile station 106 stores the 6-bit short page identity value in a computer-readable memory, such as a flash memory, located either in the mobile station or in the SIM. In the step 1015, the mobile station 106 transmits a message to the mobile switching center acknowledging receipt of the 6-bit SPI value. In an alternative embodiment, wherein the 6-bit value is calculated based on some transformation of either the TMSI or IMSI, then the 6-bit value need not be communicated from the mobile switching center 102 to the mobile station 106.

In a further step 1016, the mobile switching center 102 associates the mobile station 106 with a paging group number according to known GSM specifications. The selected paging group number relates to a particular paging channel 218 (PCH) in a multiframe 208. Generally, existing mobile stations examine a paging channel (PCH) every 0.5 to 2 seconds. A 51-frame multiframe is transmitted approximately every 0.25 seconds. Thus, a typical mobile station skips from one to seven multiframes between processing of a page channel (PCH). The paging group number determines how many multiframes a mobile station 106 skips between processing paging channels.

The mobile station 106, once associated with a particular paging group number, uses known GSM specifications to scan for telephone calls or paging messages directed to the mobile station 106 by receiving and processing just the paging channel information identified by the paging group number. For example, if a mobile station 106 is associated with a paging group number which relates to the first paging channel 218 (PCH) (see FIG. 2) occupying time slots 7–10 in a 51-frame multiframe, then any telephone calls or paging messages directed to the mobile station 106 would be represented in the four time slots of the first paging channel in the multiframe, and the mobile station 106 may disregard other common control channels without any risk of missing telephone calls or paging messages.

Those of ordinary skill in the art will also appreciate that a paging group number, under the GSM specification, may identify a single paging channel (PCH) in a span of up to 8 multiframes. In such a case, the mobile station 106 need only examine one particular paging channel within 8 entire multiframes to determine whether any telephone call or paging message has been directed to the mobile station 106. Also, in accordance with standard GSM practices, a mobile station 106 can calculate a paging group number by accessing a channel distribution value from a broadcast control channel (BCCH) and performing a predetermined calculation using the channel distribution value.

In an embodiment of the present invention, instructions of the SPCH registration module 714, in a step 1018, associate the mobile station 106 with a short paging group number. In one embodiment, the short paging group number relates to a specific short page channel (SPCH) 504 (see FIG. 5) within one of up to eight multiframes 502. Further, the short paging group number refers to one of the four time slots 506 in a short page channel (SPCH) 504 and also identifies one of four possible 6-bit mobile station identifiers 624 (see FIG. 6) carried in a single time slot of a short page channel. Thus, using the short paging group number in accordance with the present invention, the mobile station 106 understands which multiframes to access, which short page channel SPCH to access, which time slot of the SPCH to access, and which 6-bit mobile station identifier value to access in order to detect call alerts. Alternatively, rather than specifying which time slot (1–4) of a short page channel SPCH to access, the short paging group number could specify which time slot (1–51) of a multiframe to access.

In another alternative embodiment wherein the mapping of signal channel information across a multiframe is changed and wherein short page channel SPCH time slots are not located in four successive time slots, the short paging group number could reference a particular time slot in a multiframe, or a particular time slot from a number of multiframes. For example, the short paging group number may reference the seventh time slot of every other multiframe, the 17th time slot of every third multiframe, or the 33rd time slot of every sixth multiframe. Moreover, in various embodiments, a single time slot of a short page channel may contain one, two, three, or more mobile station identifier values having bit lengths other than 6 bits. In any of those various embodiments, the short paging group number may reference one of the mobile station identifiers contained in a time slot of a short page channel (SPCH). For example, a 12-bit short paging group number could be allocated as follows: 2 bits (a value ranging from 0–3) to identify one of four 6-bit mobile station identifiers 624 contained in a single short page channel (SPCH) time slot, 6 bits (a value ranging from 0–63) to identify a single time slot (1–51) in a 51-frame multiframe, and 4 bits (a value ranging from 0–7) to identify a span of up to 8 multiframes.

In one embodiment of the present invention, a mobile station 106 extracts a channel distribution value from a broadcast control channel (BCCH) and uses the channel distribution value to calculate a short paging group number. Alternatively, the mobile switching center 102 transmits the short paging group number to the mobile station 106 whereupon the mobile station 106 stores the short paging group number in computer-readable memory, such as flash memory, either internal to the mobile station 106 or on a SIM card. A mobile switching center 102 selects a short paging group number for the mobile station 106 to balance short page signaling information across each multiframe transmitted to a cell 108.

After registering with the network, the mobile station 106 can then use the network to initiate or receive telephone calls or page messages. In one embodiment of the present invention, the mobile station 106 reduces the processing associated with standby mode (scanning for pending telephone calls or page messages) by examining fewer paging channels (PCH) in a time period than the number recommended or directed by the mobile switching center 102. For example, the mobile switching center 102 determines that the mobile station 106 belongs to a paging group which examines a paging channel 218 (PCH) occupying time slots 7–10 of a 51-frame multiframe 208, and the paging group only examines every second multiframe (i.e., skips 1 multiframe between processing of the identified paging channel 218). Existing mobile stations would respond by processing the identified paging channel 218 in every second multiframe. According to one embodiment of the present invention, the mobile station 106, having been directed by the mobile switching center 102 to process the paging channel 218 in every second multiframe, instead doubles the multiframe skipping value and examines the paging channel 218 in every fourth multiframe.

In this embodiment, the mobile station 106 conserves battery power by reducing the amount of processing associated with standby mode (scanning for telephone calls or paging messages). Because the mobile switching center 102, under the current GSM standard, will broadcast paging channel information about four times for a particular paging group, the mobile station 106 is not likely to miss a call. Further, the system could be modified slightly to increase the number of times the paging information is sent. However, because the standby processing time and, hence, power consumption is cut roughly in half, the lifetime of the mobile station's 106 battery 812 is approximately doubled. Just as paging channel (PCH) information may be skipped to conserve battery power, short page channel (SPCH) information may also be skipped.

A short paging group number, discussed in more detail below, may direct a mobile station 106 to examine and process particular short page channels (SPCH) from particular multiframes. For example, a short paging group number may direct a mobile station to process the first time slot 628 of the first short page channel 504 (SPCH) of every 4th multiframe 502. The mobile station 106 may respond to such direction by processing the first time slot 628 of the first short page channel 504 (SPCH) of every 8th multiframe 502. In this manner, the mobile station 106 reduces the amount of battery power consumed during standby mode. Because the amount of short page channel information is cut roughly in half, the battery power consumption applied to monitoring the short page channel is also cut in half. Any risk of missing a short page channel may be avoided in an embodiment wherein the mobile switching center increases the number of short pages for a pending telephone call or paging message to compensate for the skipping, providing the same exposure to the short page channel as the mobile station 106 would have if it skipped no short page channels. Increasing the number of short pages could be done dynamically, such as whenever the mobil switching center determines that increasing the number of short pages for a telephone call or paging message would not substantially affect the load on a time slot (physical channel).

Figure 11:
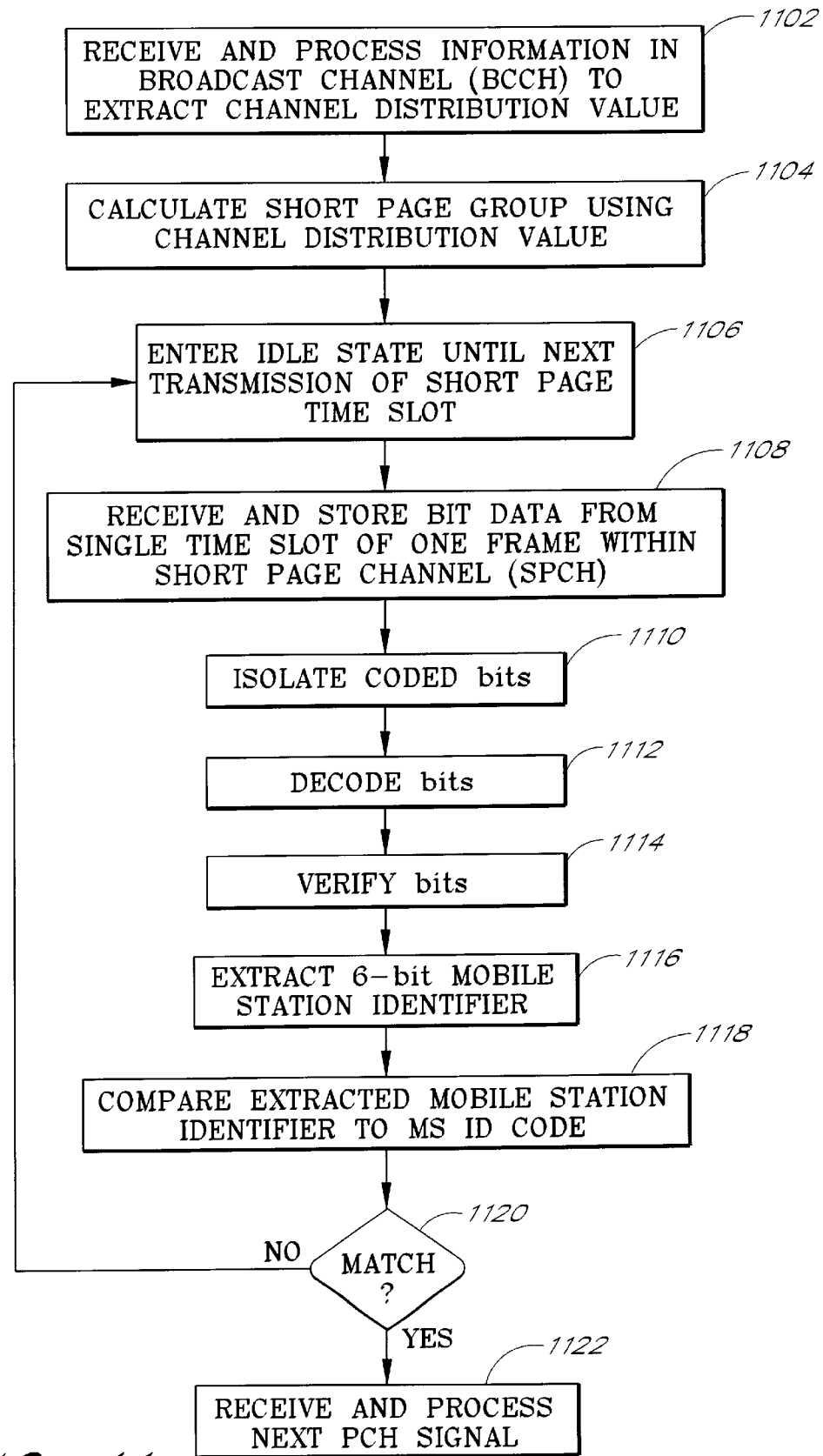
FIG. 11 illustrates steps performed to scan a base station transmission for telephone calls or page messages in accordance with an embodiment of the present invention.

FIG. 11 illustrates steps performed in one embodiment of the present invention to scan a base station 104 transmission for telephone calls or page messages. In a first step 1102, the mobile station 106 receives and processes information in the broadcast channel 214 to extract a channel distribution value. In a next step 1104, the mobile station 106 calculates a short paging group number using the channel distribution value. In one embodiment, the short page channel distribution value indicates two quantities: (1) the number of multiframes for the next short page channel (this value can be designated M); and (2) the number of short paging frames in a 51-frame multiframe (this value can be designated N). The software instruction processing module advantageously executes instructions of the short paging group number calculation module 820 to perform a modulo 4 operation (remainder of division by 4) on the mobile station's 106 IMSI number to derive a 2-bit value (0, 1, 2, or 3) representing which of four possible 6-bit mobile station identity values 624 the mobile station 106 may examine. The short paging group number calculation module 820 then advantageously derives a 6-bit value by performing a modulo N (remainder of division by N) operation on the mobile station's 106 IMSI number to identify a particular time slot within a multiframe. The short paging group number calculation module also advantageously performs a modulo M operation on the mobile station's 106 IMSI number to derive a 4-bit number (0–7) representing a number of multiframes between those multiframes having short page channel information for the mobile station 106 (e.g., the value 5 indicates that the mobile station 106 should skip 5 multiframes before examining another short page channel, in other words to examine short page channel information in every 6th multiframe). Thus, the short paging group number indicates to the mobile station 106 which multiframes to examine for short page channel information, which time slot in a multiframe to examine, and which mobile station identity value to examine within a selected time slot.

In a step 1106, the mobile station 106 enters an idle state wherein it performs no processing until the next transmission of the short page time slot referenced (and determined) by the short paging group number. In such idle state, the mobile station's 106 use of battery power is minimized. In a further step 1108, the mobile station 106 becomes active and the software instruction processing unit 802 executes instructions of the SPCH receive module 816 to receive and store bit data from the short page channel (SPCH) time slot identified by the short paging group number.

In a step 1110, the software instruction processing unit 802 executes instructions of the SPCH processing module 818 to enable the mobile station 106 to process the bit data from the short page channel time slot. Accordingly, in the step 1110, the mobile station 106 drops the tail bits 602, 610, the synchronization bits 606, and the guard period bits 612, and combines the first 39 coded bits 604 and the second 39 coded bits 608 into a stream of 78 coded bits 614. In an alternative embodiment wherein the 78 bits are interleaved, the mobile station 106 reorders the 78 bits. In a further step 1112, the mobile station 106 decodes the coded bits to reverse convolutional coding.

In a further step 1114, the mobile station 106 advantageously uses a 10-bit cyclic redundancy check 618 to verify accuracy of the bits. Next, in a step 1116, the mobile station 106 extracts one of four possible 6-bit mobile station identifiers 624 carried by the short page time slot. The mobile station 106, still executing instructions of the SPCH processing module 818, determines which 6-bit mobile station identifier to extract by examining the short paging group number (which it either calculates or which has already been stored in the mobile station's 106 memory) which references one of the four 6-bit mobile station identifiers 624.

In a step 1118, the mobile station 106 compares the extracted 6-bit mobile station identifier to a 6-bit identifier value stored in flash memory in either the mobile station itself or in the SIM card. If, in the step 1120, the mobile station 106 determines that the two 6-bit values match, then the mobile station 106 is alerted that there may be a telephone call or page message directed to the mobile station 106, in which case the mobile station 106, in a step 1122, performs steps to receive and process the next paging channel (PCH) signal. If, however, in the step 1120, the mobile station 106 determines that the extracted 6-bit mobile station identifier value does not match the internally stored 6-bit identifier value, then processing loops back to the step 1106 wherein the mobile station 106 enters an idle state until the next transmission of the short page channel (SPCH) time slot.

Once a mobile station 106 is alerted in accordance with the present invention to the presence of a telephone call or paging message potentially directed to the mobile station 106, then the mobile station 106, in one embodiment of the present invention, carries out certain steps already practiced in the art to access and examine paging channel (PCH) information to determine with certainty whether it is the intended recipient of the telephone call or paging message. Because of the length of the alert message, 6 bits in one embodiment, the mobile station cannot always be uniquely identified, that is, the same 6-bit code may be assigned to more than one mobile station. Occasional false alerts do not detract from the value of the present invention because the short page message still results in significant power consumption savings during the standby period.

Following each alert, the mobile station 106 examines an appropriate four-time slot paging channel (PCH) 218 (see FIGS. 2 and 5) to ascertain if the mobile station 106 is the intended recipient of the telephone call or page message. The total power consumption associated with examining single short page time slots for call alerts and occasional processing of paging channel (PCH) information associated with false alerts is far less than the power consumption associated with repetitive processing of four-time slot paging channels (PCH) to determine in every possible case whether the mobile station 106 is the intended recipient of a phone call or page message.

Figure 12:
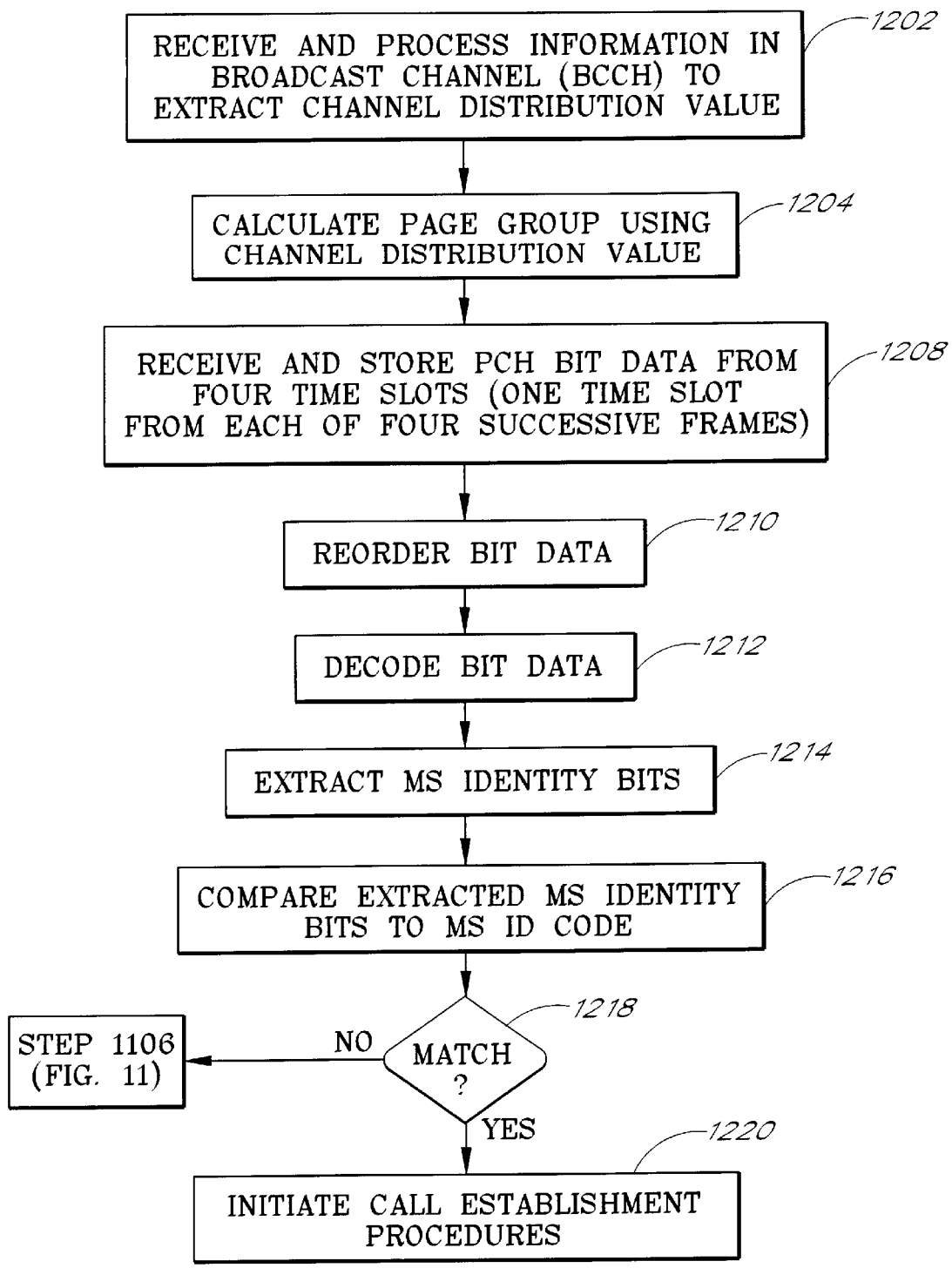
FIG. 12 illustrates steps performed to determine whether a mobile station is the target of a pending telephone call or page message in accordance with an embodiment of the present invention.

FIG. 12 illustrates steps performed by a mobile station 106 to determine whether it is the target of a pending telephone call or page message. Some of the steps in FIG. 12 would be practiced in existing systems not using the present invention. In a first step 1202, the mobile station 106 receives and processes information in the broadcast channel (BCCH) to extract a channel distribution value. In a further step 1204, the mobile station 106 calculates a paging group number using the channel distribution value. The paging group number identifies a particular paging channel PCH the mobile station 106 should examine to determine whether any telephone calls or page messages have been directed to the mobile station 106.

In a further step 1208, the mobile station 106 receives and stores paging channel (PCH) bit data from the four time slots of the paging channel (PCH). Using known GSM-based techniques, the mobile station 106 reorders interleaved bit data in a step 1210 and, in another step 1212, decodes the bit data to reverse the convolutional coding performed prior to transmission of the paging channel (PCH) data.

In still another step 1214, the mobile station 106 extracts mobile station identifier bits from the decoded bit data. In a further step 1216, the mobile station 106 compares the extracted mobile station identifier bits to a mobile station ID code stored internally in computer-readable memory, such as a flash memory in the mobile station 106 or in a SIM card. If, in a step 1218, the mobile station 106 determines that the extracted mobile station identifier bits match the internally stored mobile station identifier, then, in a step 1220, the mobile station 106 initiates call establishment procedures. Those of ordinary skill in the art will have familiarity with GSM-based call establishment procedures. If, however, in the step 1218, the mobile station 106 determines that there is no match, then the mobile station enters an idle state in accordance with one embodiment of the present invention described in relation to step 1106 (see FIG. 11) to await the next transmission of a short page channel (SPCH) time slot.

Some embodiments of the present invention advantageously ensure backward compatibility with mobile stations that cannot process short page channel (SPCH) information. In those embodiments, the mobile switching center 102 generates standard paging channels (PCH) and short page channels (SPCH) and transmits those channels to the base station 104 for retransmission to the mobile stations 106. Thus, mobile stations 106 not equipped to receive and process short page channel (SPCH) information may still rely on the presence of standard paging channel (PCH) information to detect telephone calls and page messages. Accordingly, some embodiments of the present invention are completely backward compatible with existing implementations of the GSM standard in wireless communication networks, but also support mobile stations 106 equipped to receive and process short page channels (SPCH).

Figure 13:
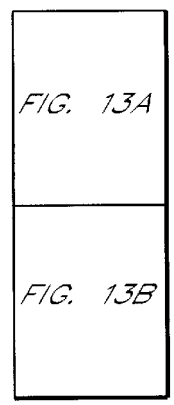
FIGS. 13A and 13B illustrate steps performed by the mobile switching center to generate a short page channel (SPCH) in accordance with an embodiment of the present invention.
Figure 13A:
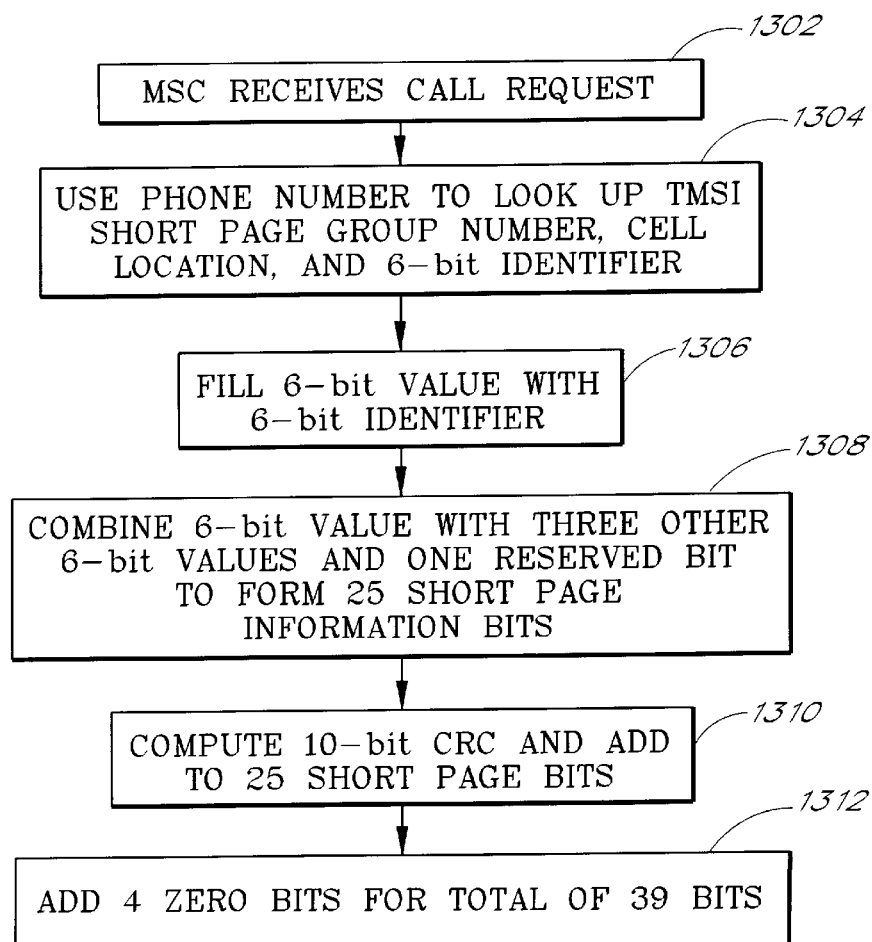
Figure 13B:
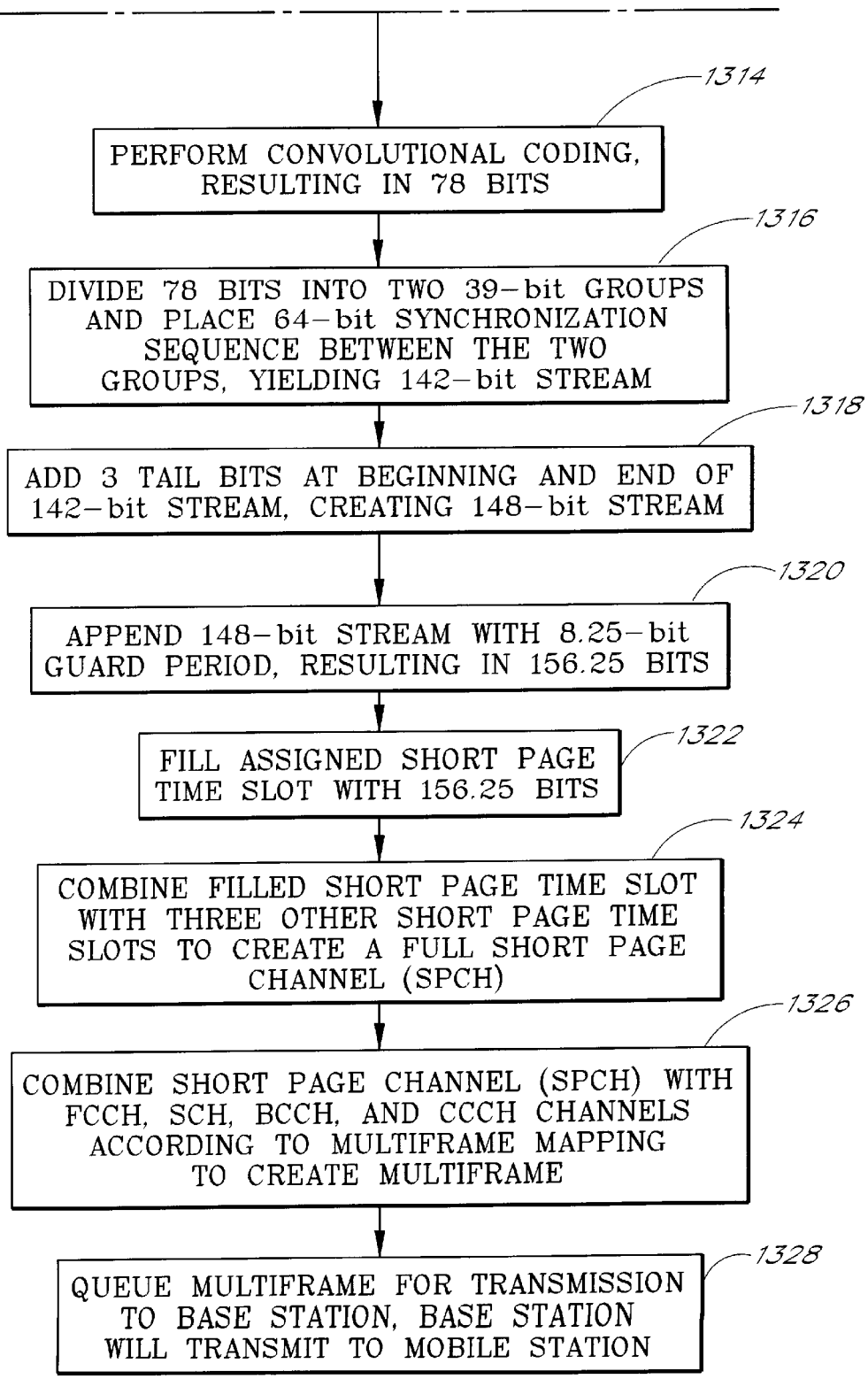

FIGS. 13A and 13B illustrate steps performed by the mobile switching center 102 to generate a short page channel (SPCH). In a first step 1302 (see FIG. 13A), the mobile switching center 102 receives a call request from a telephone user directed to a mobile station 106. In one embodiment, the steps illustrated in FIGS. 13A and 13B following the step 1302 are performed by instructions of the SPCH creation module as executed by the software instruction processing unit 704.

In a step 1304, the mobile switching center uses the phone number of the call request as an index into the visitor location register (VLR) to locate information related to the target mobile station 106. In particular, the mobile switching center 102 uses the phone number to obtain the mobile station's 106 TMSI value, the mobile station's 106 short paging group number assignment, the mobile station's cell location, and the mobile station's 6-bit identifier. As noted above, in alternative embodiments, the mobile switching center 102 calculates the mobile station's 106 6-bit identifier from the mobile station's 106 TMSI or IMSI as necessary, and need not, in those embodiments, retrieve the 6-bit value from storage.

The mobile switching center 102, in a step 1306, begins to generate short page data to alert the mobile station 106 by filling a 6-bit value using the 6-bit identifier associated with the mobile station 106. In another step 1308, the mobile switching center 102 combines the 6-bit value with three other 6-bit values (either dummy values containing dummy bits or operative 6-bit values associated with other mobile stations to be alerted) and one reserved bit to form 25 short page information bits. In one embodiment, the value of the reserved bit depends on whether the content of the broadcast control channel has changed. In this embodiment, instructions of the SPCH creation module 716 compare the contents of a most recent broadcast control channel (BCCH) to the contents of the prior BCCH. If the contents differ, then the SPCH creation module toggles the value of the reserved bit, otherwise the value of the reserved bit is unchanged.

The mobile switching center 102 computes a 10-bit cyclic redundancy check (CRC) and adds the 10-bit CRC value to the 25 short page information bits, resulting in 35 bits. Next, in a step 1312, the mobile switching center 102 adds four zero bits to the 35 bits for a total of 39 bits. In a further step 1314 (see FIG. 13B), the mobile switching center 102 performs convolutional coding on the 39 bits, facilitating error detection and correction by a receiving mobile station. Convolutional coding is well known in the art and is not described in detail herein. The convolutional coding doubles the number of bits, resulting in 78 coded bits. In a further step 1316, the mobile switching center 102 divides the 78 coded bits into two 39-bit groups and places a 64-bit synchronization sequence between the two 39-bit groups, creating a 142-bit stream. The long, 64-bit synchronization sequence assists the mobile station 106 in synchronizing with a time slot of the short page channel (SPCH) when it is ultimately transmitted by the base station 104.

The mobile switching center 102 adds three tail bits at the beginning of the 142-bit stream and adds an additional three tail bits at the end of the 142-bit stream, creating a 148-bit stream. In a still further step 1320, the mobile switching center 102 appends the 148-bit stream with an 8.25-bit guard period, resulting in 156.25 bits.

The mobile switching center 102 then determines which of four time slots in the short page channel has been assigned to the targeted mobile station 106, and fills the assigned short page time slot with the 156.25 bits. In a step 1324, the mobile switching center 102 combines the filled short page time slot with three other short page time slots (possibly dummy time slots filled with dummy bits, or operational time slots carrying bit-oriented data to alert other mobile stations) to create a full short page channel (SPCH). The mobile switching center 102 next creates a multiframe in a step 1326 by combining the full short page channel (SPCH) with frequency correction channel (FCCH) information, synchronization channel (SCH) information, broadcast control channel (BCCH) information, and common control channel (CCCH) information according to a predetermined multiframe mapping such as that illustrated by FIG. 5. In a step 1328, the mobile switching center 102 queues the newly created multiframe for transmission to the base station 104. Upon receiving the multiframe, the base station 104 transmits the multiframe to the cell 108 containing the target mobile station 106.

As described above, in one embodiment of the present invention, the mobile switching center 102 places a 64-bit synchronization sequence within the 156.25 bits of a short page channel (SPCH) time slot. Those of ordinary skill in the art will appreciate that such a format for bits of a time slot is referred to as a synchronization burst 628 (SB) (see FIG. 6). A short page channel time slot having fewer or more than 64 synchronization bits may still carry sufficient short page information bits to identify a mobile station 106 and to thereby alert the mobile station 106 to a telephone call or page message. However, using the synchronization burst format for a single short page channel time slot advantageously reduces the timing precision needed by the mobile station 106 to lock onto (synchronize with) a particular short page channel time slot.

Typically, after a mobile station examines paging channel (PCH) information and determines that no telephone call or page message has been directed to the mobile station 106, it enters a timed idle state. The mobile station 106 knows when the next paging channel (PCH) information will be transmitted, and the idle state period is precisely timed so that the mobile station 106 will emerge from (exit) the idle state just in time to receive the next paging channel (PCH). Existing mobile stations 106 use a highly precise master clock 808 to time the idle state with the necessary precision. One example of such a clock is a crystal-based clock operating at 13 MHz consuming approximately 2–3 milliamps. Thus, even in the idle state, a mobile station 106 consumes battery power to operate the master clock 808.

Lower accuracy (or lower precision) clocks 810 exist which consume far less battery power than the master clocks 808 typically used by mobile stations 106. One example of a lower precision clock is a clock operating at 32 kHz consuming a few microamps. Because the relatively long, 64-bit sequence of synchronization bits in one embodiment of the short page channel time slot reduces the precision needed to time the idle state, a mobile station 106 in accordance with one embodiment of the present invention advantageously uses a low precision clock 810, rather than a highly precise master clock 808, to time the idle state, dramatically reducing battery consumption during the idle state.

Figure 14:
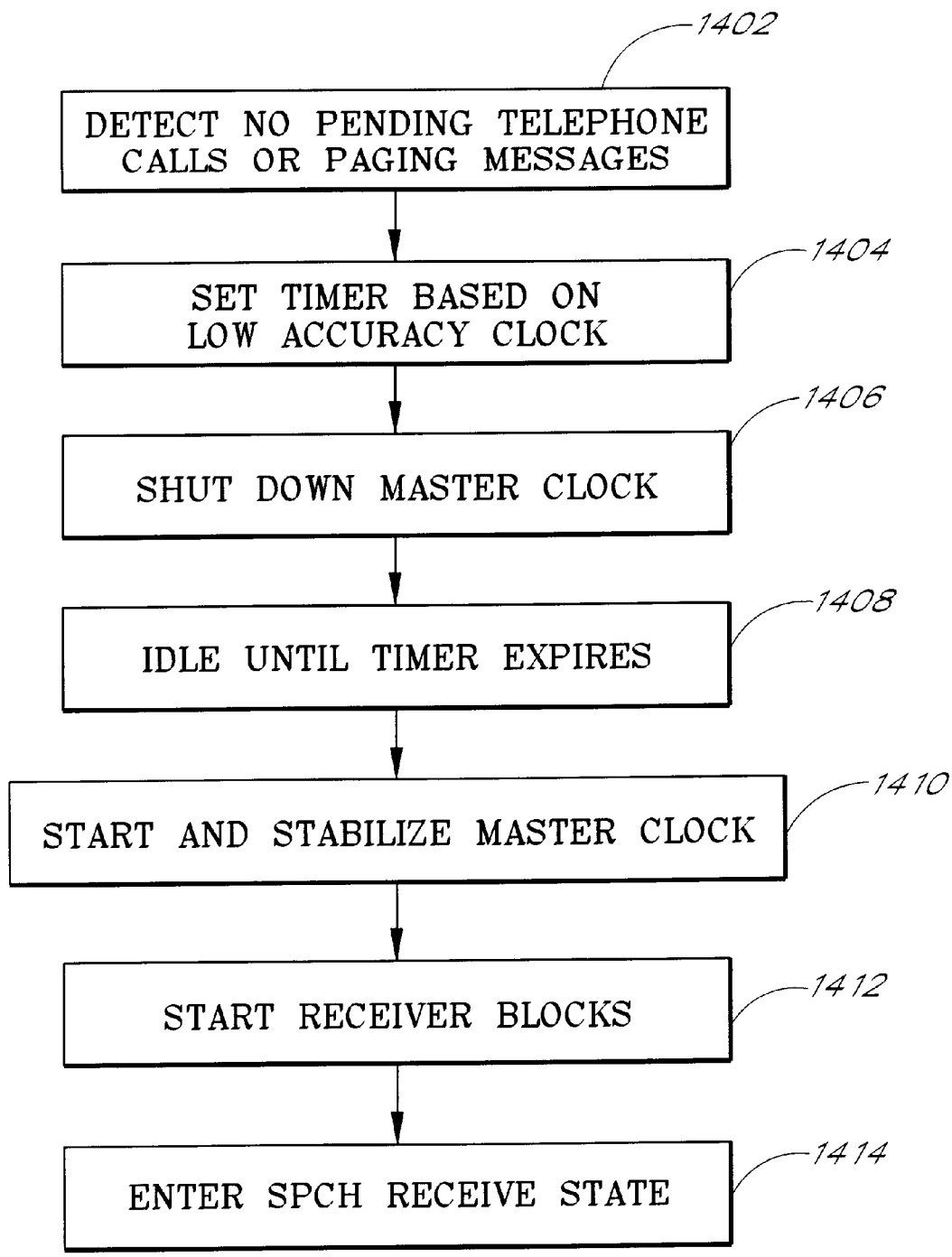
FIG. 14 illustrates steps performed by a mobile station to time an idle state using a low precision clock in accordance with an embodiment of the present invention.

FIG. 14 illustrates steps performed by a mobile station 106 in accordance with one embodiment of the present invention to time an idle state using a low precision clock 810. In a first step 1402, the mobile station 106 detects no telephone calls or page messages by examining either a single time slot of a short page channel SPCH or four time slots of a paging channel (PCH). In a further step 1404, the mobile station 106 sets a timer based on a low precision clock 810. In another step 1406, the mobile station 106 shuts down the master clock 808 and related circuitry, eliminating any battery power consumption by the master clock 808. In one embodiment of the present invention, the low precision clock 810 is accurate to about 9 microseconds per second or 1 second per day after calibration by the master clock 808.

With the timer set, the mobile station idles in a step 1408. While idling, the mobile station 106 need not consume any power beyond that required to operate the low precision clock 810. The mobile station 106 idles until the timer expires. In a further step 1410, the mobile station starts and stabilizes the master clock 808. In one embodiment of the present invention the low precision clock 810 runs continuously. In an alternative embodiment, the low precision clock 810 can be stopped after starting the master clock 808, and the low precision clock 810 can be started just before stopping the master clock 808.

In another step 1412, the mobile station 106 starts receiver blocks. The receiver blocks perform the signal processing function of locking onto (synchronizing with) the next transmission of a short page channel (SPCH) time slot. It will be appreciated by those of ordinary skill that existing receiver blocks easily synchronize with a transmitted time slot having a 64-bit synchronization sequence even when the synchronization is timed with a low precision clock 810 accurate to 9 microseconds per second or 1 second per day when calibrated by the master clock 808. In a step 1414, the mobile station 106 enters a receive state in which it receives the next short page channel (SPCH) time slot to detect whether a telephone call or page message has been directed to the mobile station 106.

In another embodiment, a clock having multiple precision levels is used to time the idle state. During the idle state, before receipt of a next short page channel time slot, the clock is set to a lower precision level, in which level the clock consumes less power than that consumed when the clock is operating at a higher precision level. At the end of the idle state, the clock is set to a higher precision level.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A mobile station comprising:
    a software instruction processing unit;
    a software instruction storage comprising a computer-readable medium, said software instruction storage accessible to said software instruction processing unit;
    a short page channel receiving module stored in said software instruction storage, said short page channel receiving module including receiving instructions executed by the software instruction processing unit, said receiving instructions causing said mobile station to scan broadcast information in a wireless communication network for a short page channel and to receive a single time slot of said short page channel containing one group of call alert data, said wireless communication network operating in accordance with the GSM standard, said single time slot less than one millisecond in duration and representing less than 128 data bits; and
    a short page processing module stored in said software instruction storage, said short page processing module including processing instructions executed by the software instruction processing unit, said processing instructions causing said mobile station to process said one group of call alert data and to determine from said group of call alert data whether a pending telephone call or paging message may have been directed to the mobile station.

2. The mobile station as described in claim 1, further comprising:
    an idle state wherein the mobile station does not scan for a short page channel or receive or process call alert information, the mobile station entering said idle state during a time period between broadcasts of said short page channel; and
    a battery providing power to the mobile station, the mobile station consuming said power at a first rate during said scanning for said short page channel and during receiving or processing said call alert information, the mobile station consuming said power at a second rate in said idle state, said second rate being less than said first rate.

3. The mobile station as described in claim 2, further comprising:
    a master clock; and
    a low precision clock, said low precision clock being sufficiently precise to time the receipt of a single short page channel time slot, said low precision clock less precise than said master clock, said low precision clock consuming less power during a time interval than said master clock, said low precision clock timing said idle state, said master clock shut down during said idle state.

4. A mobile station, comprising:
    a call alert module structured to extract an alert message from transmitted call alert data, said call alert module responding to call alert data received from a call alert channel of a wireless communication system by determining whether a pending telephone call or paging message may be directed to the mobile station, and by so alerting said mobile station; and
    a paging module structured to extract a paging message from transmitted paging data, said paging module responding to paging data received from a paging channel of said wireless communication system by determining whether said telephone call or paging message is directed to the mobile station, said call alert data requiring less processing than said paging data.

5. The mobile station as described in claim 4, further comprising:
    a call establishment module which initiates the establishment of a communication link to a communication device responsible for initiating said telephone call or paging message, said call establishment module invoked upon said determining that said telephone call or paging message is directed to the mobile station.

6. A mobile station, comprising:
    a short page module structured to extract paging data from a time slot of a short page channel transmitted by a wireless communication system operating in accordance with the GSM standard, said short page module responding to receipt of said time slot by determining from said paging data in said time slot that a telephone call or paging message may have been directed to said mobile station, said time slot less than one millisecond in duration and representing less than 128 bits; and
    a paging module, said paging module responding to receipt of four time slots of a paging channel by determining whether the mobile station is the intended recipient of a telephone call or paging message, said paging module invoked upon said determination that a telephone call or paging message may have been directed to said mobile station.

7. The mobile station as described in claim 6, further comprising:
    a call establishment module which initiates the establishment of a communication link to a communication device responsible for initiating said telephone call or paging message, said call establishment module invoked upon said determining that said mobile station is the intended recipient of said telephone call or paging message.

8. The mobile station described in claim 7, further comprising:
    a data storage area; and
    a short page identity value stored in said data storage area, said short page module comparing a mobile station identity value in said call alert data to said short page identity value to make said determination that said telephone call or paging message may have been directed to said mobile station.

9. A cellular system comprising:
    a base station;

a cell;

a receiver in said cell;

a battery powering said receiver;

an alert channel in which said base station transmits within said cell alert information to alert said receiver of a pending telephone call or paging message; and a paging channel in which said base station transmits within said cell paging information to notify said receiver that said receiver is the intended recipient of said telephone call or paging message, the processing of said paging information consuming more power of said battery than the processing of said alert information.

10. The cellular system as described in claim 9, further comprising:

receiver identity information within said alert information, said receiver identity information not uniquely identifying said receiver.

11. The cellular system as described in claim 9, further comprising:

a communication channel used by said receiver to establish a communication link following said receiver receiving paging information notifying said receiver that said receiver is the intended recipient of said telephone call or paging message.

12. A mobile station with reduced standby processing requirements, comprising:

a data storage area;

a paging group value stored in said data storage area, said paging group value specifying first paging channels, said paging group value assigned to said mobile station by a mobile switching center;

a paging channel skipping value stored in said data storage area, said paging channel skipping value specifying a subset of said first paging channels, said subset identifying paging channels transmitted less frequently than said first paging channels; and a short paging group value identifying a subset of multiframes transmitted by said mobile switching center and identifying a time slot in each of said subset of multiframes, said mobile station receiving data represented in each identified time slot and determining from said data whether a pending telephone call or paging message may have been directed to said mobile station, said mobile station receiving and processing said subset of said first paging channels only upon said determining that a pending telephone call or paging message may have been directed to said mobile station, said mobile station determining from said processing of said subset of said first paging channels whether said pending telephone call or paging message was directed to said mobile station.

13. A mobile station with reduced requirements for processing broadcast control data, said mobile station comprising:

a data storage area;

a short page channel data buffer in said data storage area including a bit reserved for updating broadcast control information, said bit received by said mobile station from a time slot of a TDMA frame;

a software instruction storage in a computer-readable medium; and a broadcast control update module stored in said software instruction storage, said broadcast control update module responding to receipt of said bit by comparing said bit to a prior received bit stored in said data storage area and, if said compared bits differ, directing the mobile station to receive and process a next transmitted broadcast control channel to update communication parameters of the mobile station and storing the newly received bit in place of the prior received bit.

14. A wireless communication system comprising:

a mobile switching center, said mobile switching center generating a first single time slot of a short page channel, said first single time slot including a first mobile station identifier value, said mobile switching center transmitting said first single time slot to a base station, said mobile switching center generating a paging channel having four time slots, said four time slots including a second mobile station identifier, said mobile switching center transmitting said four time slots to said base station;

a base station which receives said first single time slot and said four time slots, said base station transmitting to a cell said first single time slot in a short page channel and said four time slots in a paging channel; and a mobile station in said cell, said mobile station identified by said first mobile station identifier and by said second mobile station identifier, said mobile station receiving said first single time slot from said short page channel and extracting said first mobile station identifier from said first single time slot to determine that a pending telephone call or paging message may be directed to said mobile station, said mobile station, upon said determination, receiving said four time slots from said paging channel and extracting said second mobile station identifier to conclude that said mobile station is the intended recipient of said telephone call or paging message, said mobile station, upon said conclusion, initiating call establishment procedures to create a communication link between said mobile station and a communication device responsible for initiating said telephone call or paging message.

15. The wireless communication system as described in claim 14, further comprising:

a broadcast control update bit, said update bit included in said first single time slot, said update bit having a first value if the content of a most recently transmitted broadcast control channel in said cell did not change from the content of an immediately preceding broadcast control channel transmitted in said cell, said bit having a second value if the content of the said recently transmitted broadcast control channel is different from the content of said immediately preceding broadcast control channel, said mobile station extracting said update bit from said first single time slot and, if said update bit has said second value, then said mobile station receiving and processing a next transmitted broadcast control channel.

16. The wireless communication system as described in claim 14, further comprising:

a data storage area in said mobile station;

a paging group value stored in said data storage area, said paging group value specifying first paging channels, said paging group value assigned to said mobile station by said mobile switching center; and a paging channel skipping value stored in said data storage area, said paging channel skipping value specifying a subset of said first paging channels, said subset identifying paging channels transmitted less frequently than said first paging channels, said mobile station receiving and processing said subset of said first paging channels.

17. The wireless communication system as described in claim 16, further comprising:

a master clock timing said receipt of said four time slots by said mobile station;

a second single time slot, said mobile switching center transmitting said second single time slot to said base station, said base station transmitting to said cell said second single time slot in said short page channel, said mobile station receiving said second single time slot from said short page channel upon determining from said receipt of said first single time slot that a pending telephone call or paging message is not directed to said mobile station; and a low precision clock timing the duration of an idle state wherein said mobile station does not receive, transmit, or process data, said duration of said idle state occurring after said receipt by said mobile station of said first single time slot and before said receipt by said mobile station of said second single time slot, said second single time slot containing sufficient synchronization bits to permit said receipt of said second single time slot, said master clock shut down during said idle state, said low precision clock consuming less power during a time interval than said master clock.

18. The mobile station as described in claim 4, wherein said paging module is invoked upon said alerting said mobile station that a pending telephone call or paging message may be directed to the mobile station.

19. The mobile station with reduced standby processing requirements as described in claim 12, further comprising:

a short page channel distribution value extracted from data transmitted over a broadcast channel, said mobile station using said short page channel distribution value to calculate said short paging group value.

* * * * *